United States Patent
Hinrichs et al.

(10) Patent No.: US 10,044,570 B2
(45) Date of Patent: Aug. 7, 2018

(54) POLICY MANAGEMENT SYSTEM WITH PROACTIVE AND REACTIVE MONITORING AND ENFORCEMENT

(71) Applicant: VMware, Inc., Palo Alto, CA (US)

(72) Inventors: Timothy Hinrichs, Los Altos, CA (US); Peter J. Balland, III, Dublin, CA (US); Martin Casado, Portola Valley, CA (US); Pierre-Emmanuel Ettori, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 26 days.

(21) Appl. No.: 14/503,122

(22) Filed: Sep. 30, 2014

(65) Prior Publication Data

US 2016/0057026 A1  Feb. 25, 2016

Related U.S. Application Data

(60) Provisional application No. 62/040,994, filed on Aug. 22, 2014.

(51) Int. Cl.
*G06F 15/173* (2006.01)
*H04L 12/24* (2006.01)

(52) U.S. Cl.
CPC ........ *H04L 41/5022* (2013.01); *G06F 15/173* (2013.01); *H04L 41/0893* (2013.01);
(Continued)

(58) Field of Classification Search
None
See application file for complete search history.

(56) References Cited

U.S. PATENT DOCUMENTS 7,962,513 B1  6/2011  Boles et al.
8,683,548 B1  3/2014  Curry et al.
(Continued)

OTHER PUBLICATIONS

United States Patent and Trademark Office, "Non-Final Office Action," issued in connection with U.S. Appl. No. 14/503,103, dated Sep. 22, 2016, 29 pages.
(Continued)

*Primary Examiner* — Brian Whipple
*Assistant Examiner* — Anthony T Rotolo
(74) *Attorney, Agent, or Firm* — Hanley, Flight & Zimmerman, LLC.

(57) ABSTRACT

Some embodiments provide a method for a system that monitors a network to prevent violations of network policies. The method stores network state data that describes the network. The method identifies that a first set of stored network state data violates a particular policy declared for the network. The method issues a command to a first cloud management application to modify the network state data such that the modified network state data does not violate the particular policy. The method determines whether a requested action that modifies a second set of network state data, received from a second cloud management application, violates any policies. The method responds to the second cloud management application to permit the requested change when the modified second set of network state data does not violate any policies and deny the requested change when the modified second set of network state data violates the particular policy.

17 Claims, 14 Drawing Sheets

(52) U.S. Cl.
CPC ...... *H04L 41/5009* (2013.01); *H04L 41/5025* (2013.01); *H04L 41/145* (2013.01)

(56) References Cited

U.S. PATENT DOCUMENTS

| | | | |
|---|---|---|---|
| 8,745,734 | B1 | 6/2014 | Brandwine et al. |
| 9,106,661 | B1* | 8/2015 | Stamos ................ H04L 63/10 |
| 2004/0122967 | A1 | 6/2004 | Bressler et al. |
| 2005/0278431 | A1* | 12/2005 | Goldschmidt ...... H04L 41/0869 |
| | | | 709/207 |
| 2007/0058540 | A1* | 3/2007 | Kay ................ H04L 63/1416 |
| | | | 370/230 |
| 2008/0134175 | A1 | 6/2008 | Fitzgerald et al. |
| 2008/0148346 | A1* | 6/2008 | Gill ..................... H04L 63/20 |
| | | | 726/1 |
| 2013/0073704 | A1* | 3/2013 | Whitlock ............. H04L 43/50 |
| | | | 709/223 |
| 2013/0304917 | A1 | 11/2013 | Mittal et al. |
| 2015/0040230 | A1* | 2/2015 | Oliphant ............... G06F 21/57 |
| | | | 726/25 |
| 2015/0134699 | A1* | 5/2015 | Bhide ................ H04L 67/1097 |
| | | | 707/781 |
| 2015/0237015 | A1 | 8/2015 | Bansal et al. |
| 2015/0242634 | A1 | 8/2015 | Lietz et al. |
| 2016/0034305 | A1 | 2/2016 | Shear et al. |

OTHER PUBLICATIONS

United States Patent and Trademark Office, "Non-Final Office Action," issued in connection with U.S. Appl. No. 14/503,112, dated Aug. 12, 2016, 22 pages.

United States Patent and Trademark Office, "Final Office Action," issued in connection with U.S. Appl. No. 14/503,103, dated May 18, 2017, 39 pages.

United States Patent and Trademark Office, "Final Office action", issued in connection with U.S. Appl. No. 14/503,112, dated Jan. 13, 2017, 40 pages.

United States Patent and Trademark Office, "Non-Final Office Action," issued in connection with U.S. Appl. No. 14/503,112, dated Aug. 9, 2017, U.S. Appl. No. 14/503,112, 39 pages.

United States Patent and Trademark Office, "Final Office Action," issued in connection with U.S. Appl. No. 14/503,112, dated Feb. 27, 2018, 26 pages.

United States Patent and Trademark Office, "Non-Final Office Action," issued in connection with U.S. Appl. No. 14/503,103, dated Dec. 28, 2017, 23 pages.

\* cited by examiner

POLICY MANAGEMENT SYSTEM WITH PROACTIVE AND REACTIVE MONITORING AND ENFORCEMENT

BACKGROUND

The software-defined data center enables incredibly agile management of a multitude of cloud resources (e.g., servers, networks, storage) by enabling programmatic control of those resources. Once the basic infrastructure is in place to automatically reconfigure the cloud resources via software, the problem remains to build the management tools that automatically perform that reconfiguration if and when it becomes necessary. That software must learn about events that occur in the cloud, understand how those events impact the cloud's behavior, and take action when the behavior of the cloud falls out of line with the cloud owner's desires.

Cloud owners have a plethora of reasons to want a cloud to behave in a certain way. Sources of restrictions for the behavior of the cloud include organizational policies dictating how IT resources are to be deployed, industrial standards that determine how all organizations in a certain sector (e.g. finance or healthcare) are required to manage their IT resources, contracts an organization makes with other organizations or with individuals about cloud infrastructure allocation and content management, and governmental regulations dictating basic procedures to be obeyed. These different restrictions impose different "policies" that the cloud must obey. When a cloud violates its policy, there are various potential costs (e.g., monetary, legal, fiduciary, etc.). Enforcing policy and managing policy violations are crucial tasks for bringing the software-defined datacenter to maturity.

Automated policy-based management of the cloud has several challenges. First, many real-world policies are written in high-level terms (e.g., users, applications, data), instead of the resources that actually exist in a cloud (e.g., compute, networking, storage). Second, numerous different types of resources must be managed. A single policy might depend on organization charts stored in relational databases, configurations for networking boxes from different vendors, packages installed on different compute servers, data stored in an inventory management system, and user information stored in Active Directory. Third, depending on the policy and the cloud resources available, perfect policy enforcement (preventing violations before they occur) may be impossible.

There are many existing and proposed attempts at policy-based management for the cloud. Some of these are piecemeal solutions, focused on compute, networking, or storage in isolation. Such approaches fall short because real-world policies often span the typical infrastructure silos and require integrating information and action from compute, networking, storage, and other cloud services. While some higher-level management approaches span the traditional silos for both expressing and enforcing policies, these generally are not as robust in their preventing of policy violations as is optimal.

BRIEF SUMMARY

Some embodiments provide a system for managing policy for a network across multiple cloud services data sources. The system of some embodiments interfaces with heterogeneous cloud services of various types, such as management tools for network virtualization, compute virtualization, storage virtualization, etc. To enable this heterogeneity, some embodiments include a declarative policy language that integrates with abstractions of the cloud service management data (e.g., by defining the cloud service management data in a set of tables, with the declarative language operating on these tables). In addition, the system of some embodiments enforces the defined policies both proactively (i.e., preventing violations before they occur) and reactively (i.e., correcting violations that occur). In some embodiments, the violation prevention is interactive, with the system including a user interface for enabling an administrator to understand the policy violations and select a corrective action when multiple such actions exist.

In order to interface with heterogeneous cloud service data sources, the system of some embodiments converts data received from these sources into a unified data format. That is, the system receives network state data, possibly in different formats, from multiple different data sources that store their own data about the network. The network state data may include network ownership information, virtual machine (VM) ownership information, the attachment of VMs to networks, logical network topology, group directory information, storage virtualization and ownership information, organization charts stored in relational databases, configurations for network boxes from different vendors, packages installed on different compute servers, data stored in an inventory management system, user information stored in a directory, etc. In some embodiments, the policy management system receives all such network state data from the different types of sources and converts the network state data into a set of tables, thus treating each of the data source as if it were a relational database. In some embodiments, the system includes a common data integration interface that accepts updates from the data sources in terms of commands to insert, delete, and/or modify the values that it stores in the tables representing the data source.

As indicated, the system of some embodiments monitors various cloud services data sources to ensure that the network (i.e., the cloud) does not violate various policies. In some embodiments, the system receives these policies as a set of declarative statements (e.g., in a language based on the relational query language Datalog). The set of declarative statements for a particular policy may specify a set of conditions for the network data stored in the tables, and an action to take when the conditions are all met. The set of conditions, in some embodiments, specifies the existence of one or more data tuples in the stored set of tables that represent the network state data. In some embodiments, the actions vary depending on the type of policy. For instance, the actions might specify to record a violation of policy in a table, to command one of the cloud service management applications that functions as a data source to modify the network state (e.g., in response to a recorded violation), to permit or deny a requested change to the network state, or to present a set of possible actions to an administrator through a user interface (and then take the action selected by the administrator). In some embodiments, the system includes a compiler that receives the declared policies as short sets of declaratory statement and converts the policies into several sets of database operations (e.g., a query plan) according to a set of rules.

The actions specified by the policies may include both the identification and correction of violations as well as the prevention of violations in the first place, in some embodiments. To provide fully robust policy management, the system of some embodiments attempts to prevent violations before they occur; however, this may not always be possible, as actions taken by a cloud management application without the explicit permission of the policy management system, as well as accidental occurrences (e.g., equipment failure) could cause violations of policy. Thus, the system of some embodiments enforces policy proactively (preventing violations of policy before they occur), reactively (monitoring state updates to identify and correct violations of policy), and interactively (identifying violations, presenting the violation to a user (e.g., an administrator), and taking a corrective action specified by the user.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1:
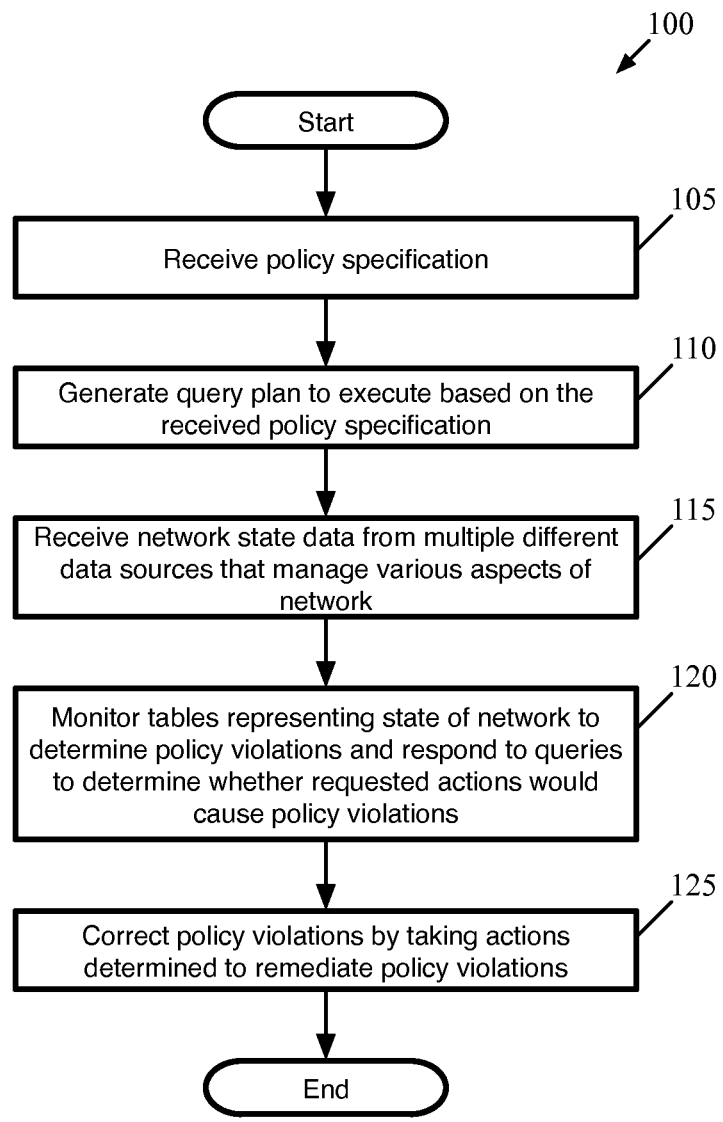
FIG. 1 conceptually illustrates an overall process performed by the policy management system of some embodiments.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a system for managing policy for a network across multiple cloud services data sources. The system of some embodiments interfaces with heterogeneous cloud services of various types, such as management tools for network virtualization, compute virtualization, storage virtualization, etc. To enable this heterogeneity, some embodiments include a declarative policy language that integrates with abstractions of the cloud service management data (e.g., by defining the cloud service management data in a set of tables, with the declarative language operating on these tables). In addition, the system of some embodiments enforces the defined policies both proactively (i.e., preventing violations before they occur) and reactively (i.e., correcting violations that occur). In some embodiments, the violation prevention is interactive, with the system including a user interface for enabling an administrator to understand the policy violations and select a corrective action when multiple such actions exist.

In order to interface with heterogeneous cloud service data sources, the system of some embodiments converts data received from these sources into a unified data format. That is, the system receives network state data, possibly in different formats, from multiple different data sources that store their own data about the network. The network state data may include network ownership information, virtual machine (VM) ownership information, the attachment of VMs to networks, logical network topology, group directory information, storage virtualization and ownership information, organization charts stored in relational databases, configurations for network boxes from different vendors, packages installed on different compute servers, data stored in an inventory management system, user information stored in a directory, etc. In some embodiments, the policy management system receives all such network state data from the different types of sources and converts the network state data into a set of tables, thus treating each of the data source as if it were a relational database. In some embodiments, the system includes a common data integration interface that accepts updates from the data sources in terms of commands to insert, delete, and/or modify the values that it stores in the tables representing the data source.

In this specification, the term "network" and "network state" are often used to refer to the overall physical network the state of which is monitored and enforced by the policy manager. This network may also be referred to as a cloud in some embodiments, and refers to a computation and networking environment in which many separate virtual or logical networks operate. The network, or cloud, may be confined to a single datacenter, a portion of a datacenter, or multiple geographically-disparate datacenters. These datacenters may be private datacenters (e.g., enterprise networks) or multi-tenant datacenters. When different networks are referred to within the network state, these different networks should be understood to be separate virtual or logical networks operating within the cloud.

As indicated, the system of some embodiments monitors various cloud services data sources to ensure that the network (i.e., the cloud) does not violate various policies. In some embodiments, the system receives these policies as a set of declarative statements (e.g., in a language based on the relational query language Datalog). The set of declarative statements for a particular policy may specify a set of conditions for the network data stored in the tables, and an action to take when the conditions are all met. The set of conditions, in some embodiments, specifies the existence of one or more data tuples in the stored set of tables that represent the network state data. In some embodiments, the actions vary depending on the type of policy. For instance, the actions might specify to record a violation of policy in a table, to command one of the cloud service management applications that functions as a data source to modify the network state (e.g., in response to a recorded violation), to permit or deny a requested change to the network state, or to present a set of possible actions to an administrator through a user interface (and then take the action selected by the administrator). In some embodiments, the system includes a compiler that receives the declared policies as short sets of declaratory statement and converts the policies into several sets of database operations (e.g., a query plan) according to a set of rules.

The actions specified by the policies may include both the identification and correction of violations as well as the prevention of violations in the first place, in some embodiments. To provide fully robust policy management, the system of some embodiments attempts to prevent violations before they occur; however, this may not always be possible, as actions taken by a cloud management application without the explicit permission of the policy management system, as well as accidental occurrences (e.g., equipment failure) could cause violations of policy. Thus, the system of some embodiments enforces policy proactively (preventing violations of policy before they occur), reactively (monitoring state updates to identify and correct violations of policy), and interactively (identifying violations, presenting the violation to a user (e.g., an administrator), and taking a corrective action specified by the user.

FIG. 1 conceptually illustrates a process 100 performed by the policy management system of some embodiments. One of ordinary skill in the art will recognize that the process 100 is not a simple linear process representing a single operation in software, but rather a conceptual process indicating the overall function of the policy management system according to some embodiments of the invention.

As shown, the process 100 receives (at 105) a policy specification. In some embodiments, this policy specification is a set of declarative statements that indicates an action to take if a set of conditions have been met. The action could be to note the existence of a violation of policy (e.g., by writing a new data tuple into a table that stores violations), to act upon such a violation of policy (by commanding a cloud service management application to take a particular action, or by presenting a set of possible actions to an administrator through a user interface), or to determine whether a potential action that modifies the network state should be permitted. In some embodiments, the declarative statements set forth the action to take if the set of conditions are all true. That is, the declarative statements are of the form Take Action IF A=true AND B=true AND C=true.

Each of the conditions, in some embodiments, is a statement about the existence of a data tuple in a particular table. For example, a policy that determines whether a particular VM is in violation of a policy includes a statement that the VM is listed in a table of VMs, along with other conditions about the VM, the network to which it is connected, etc. The policies, in some embodiments, allow for the definition of additional tables that may be used in the determination of policy violations. For instance, in order to determine whether a VM owner and a network owner are in the same group, a policy might define a table listing pairs of owners that are in the same group; this table definition is itself an action (add pair to table) taken when a particular set of conditions are met (owner A is in a particular group G AND owner B is in the same particular group G).

After receiving the policy specification, the process 100 generates a query plan to execute based on the declarative instructions in the policy. For example, in some embodiments, a set of three conditions (the A & B & C example given above) results in three different sets of join operations, each performed if one of the three different conditions occurs. That is, if a state update indicates that B has occurred, the generated query plan specifies to also join A and C, and select at least a portion of the results of the join operation for output to a different table, or to use the results as the parameters of a specific action. In some embodiments, a compiler module within the policy management system handles the generation of query plans based on declarative instructions.

The process 100 also receives (at 115) network state data from multiple different data sources that manage various aspects of the network. These data sources may include a compute virtualization manager (that handles the creation and provisioning of VMs in a network), a network virtualization manager (that handles the creation and provisioning of managed switching elements in a network in order for the managed switching elements to implement virtual networks), a storage virtualization manager, a firewall or antivirus manager, etc. These data sources may store their respective network state data in different formats. However, so long as a particular source's data can be treated as though it is a relational database, then the policy management system can interact with the data source to receive its network state data and request that it modify the network state. In some embodiments, the policy management system receives data from such heterogeneous data sources and converts it into a table format for unified storage of the network state data. In other embodiments, the various data sources include modules for integrating with the policy management system that convert the respective network state data into data tuples that can be stored in the tables of the system.

Having received policy specification(s) and network state data, the process 100 monitors (at 120) tables representing the network state to determine policy violations and responds to queries to determine whether requested actions would cause policy violations. In addition, the process corrects (at 125) detected policy violations by taking actions determined to remediate the policy violations. That is, the policy management system engages in both proactive and reactive monitoring, sometimes with respect to the same policy. For proactive monitoring, the system of some embodiments provides an application programming interface (API) that enables cloud service applications to request whether proposed changes to the network state (e.g., adding or removing a user from a group, changing the owner of a VM, as only two of the multitudes of possible examples) would result in a violation of any policies. The system simulates the changes to the network state and provides a response permitting or denying the proposed change. In some embodiments, the system additionally lets the requesting application know what policy was violated, if any.

For reactive monitoring, the system of some embodiments identifies updates to the state, and determines whether the changes cause any policy violations. That is, some embodiments treat each change in the network state as an event, and determine whether the generated query plans for any of the policies declared for the system have conditions for that event that indicate a violation and, if so, whether the conditions are met. Upon detecting a violation, some embodiments either (i) execute an API call on a particular cloud service application to cause the particular cloud service application to effect a network state change that eliminates the violation, or (ii) present to an administrator a set of operations that could be executed, allowing the administrator to choose one. Upon receiving a selection of an action to take from the administrator through the user interface, the system then executes an API call on the required cloud service application (or several applications, if multiple separate actions are required) in order to effect the requested network state change. In some embodiments, the system supports a dashboard (i.e., a user interface) that provides a list of current policy violations and allows an administrator (i.e., a cloud operator) to drill down into a violation to understand why the violation occurred. The system also computes a list of potential remediations for each violation to display on the dashboard, and executes any remediation selected by the administrator. Some embodiments also enable the administrator to indicate for the system to always take a selected corrective action for a particular type of violation, thereby automating the remediation process.

The above description introduces the policy management system of some embodiments. Several more detailed embodiments are described below. First, Section I describes the architecture of the policy management system of some embodiments. Section II then describes the declarative language for policy and examples of different types of policies. Next, Section III describes the proactive and reactive enforcement of policy performed by the policy management system of some embodiments. Finally, Section IV describes an electronic system with which some embodiments of the invention are implemented.

I. Policy Management System Architecture

As described above, some embodiments provide a policy management system for a network (e.g., a cloud network distributed across one or more data centers) that receives, stores, and analyzes data from disparate, heterogeneous cloud services (e.g., a compute virtualization manager, a network virtualization manager, a storage virtualization manager, etc.). The policy management system receives declarations of policies that may require data from more than one of these data sources to determine whether the policies have been violated. Therefore, the system stores the network state data from these heterogeneous data sources (sometimes referred to as policy-information-points, or PIPs) in a unified format, such as a set of relational database tables, that provides the writers of policy with the appearance of a single, unified abstraction of the network state.

Figure 2:
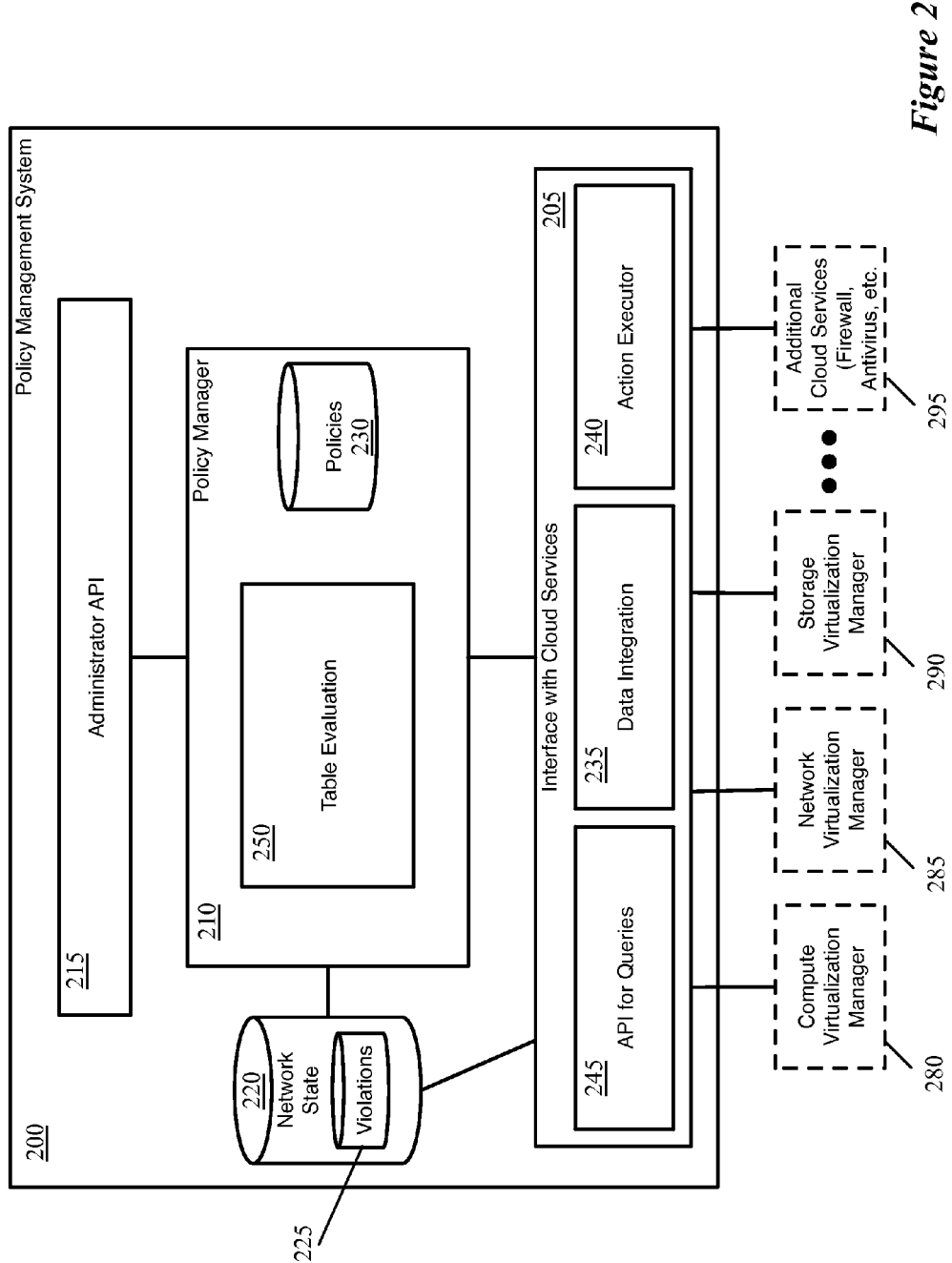
FIG. 2 conceptually illustrates the architecture of a policy management system of some embodiments.

FIG. 2 conceptually illustrates the architecture of a policy management system 200 of some embodiments. The policy management system 200 receives data from numerous cloud service data sources, integrates that data into a set of tables, and evaluates the tables according to policies the system has received to determine violations of policy. As shown, the system 200 includes an interface 205 with cloud services, a policy manager 210, and an administrator application programming interface (API) 215. The system stores network state data 220, which includes violations 225. In addition, the policy manager stores a set of policies 230.

FIG. 2 also illustrates numerous cloud services 280-295 that act as data sources (i.e., that provide the network state data 220) and carry out actions specified by the system 200. These cloud services include a compute virtualization manager 280 (e.g., OpenStack Compute (Nova), VMware's vSphere®, etc.), a network virtualization manager 285 (e.g., VMware's NSX®), a storage virtualization manager 290, as well as other cloud services 295 (which may include firewall, antivirus, group directory (e.g., Active Directory®), etc.).

The interface 205 with the cloud services 280-295 includes a data integration module 235, an action executor 240, and a query API 245. In some embodiments, these modules 235-245 are part of a single interface with the cloud services (i.e., the interface 205), while in other embodiments the modules are separate components.

The data integration module 235 of some embodiments provides a unified interface for all of the data sources upon which the policies 230 are written. The data integration module 235 receives data from the various cloud services 280-295, which may be in different formats (as these disparate data sources may store data in a variety of different formats). The data integration module 235, in some embodiments, converts this data into a unified format and stores the data in the network state data 220. In some embodiments, the data integration module 235 does not perform the data conversion, but instead provides an interface with the various cloud services. The cloud services 280-295 themselves have modules written to convert their data into a format compatible with the policy management system. For example, some embodiments accept updates from the various data sources in the form of SQL-like insert and delete commands.

In some embodiments, the network state data 220 is stored as a set of numerous tables that act as a large relational database. For example, based on data from the compute virtualization manager 280, some embodiments might store separate tables that indicate the VMs operating in the cloud, the network to which each VM connects, the owner of each VM, etc. Based on data from the network virtualization manager 285, some embodiments might store tables that indicate the privately owned networks with their owners, the publicly owned networks, etc. Similar types of data regarding the network state that is relevant to policy may be stored from the other cloud services 290 and 295.

The action executor 240 is responsible for carrying out actions that the system (e.g., the policy manager 210) or cloud administrator determines to execute in order to correct policy violations. In some embodiments, the action executor 240 is configured to be able to execute API calls to any of the cloud services 280-295 requesting that particular actions be performed (e.g., disconnecting a VM from a network, changing group ownership, etc.) in order to remove violations from the network state. In some embodiments, for each cloud service that is attached to the policy management system, the action executor 240 is updated with a new set of API calls for the particular cloud service.

The query API 245 is an API of the policy management system 200 that allows the cloud services 280-295 to query the system 200 (e.g., to determine whether a particular action that it intends to take is permitted). Specifically, in some embodiments, the query API 245 receives API calls from the cloud services that ask whether a proposed action would violate any policies. In some embodiments, the data integration module 235, action executor 240, and query API 245 form a two-way interface with the cloud services.

Figure 3:
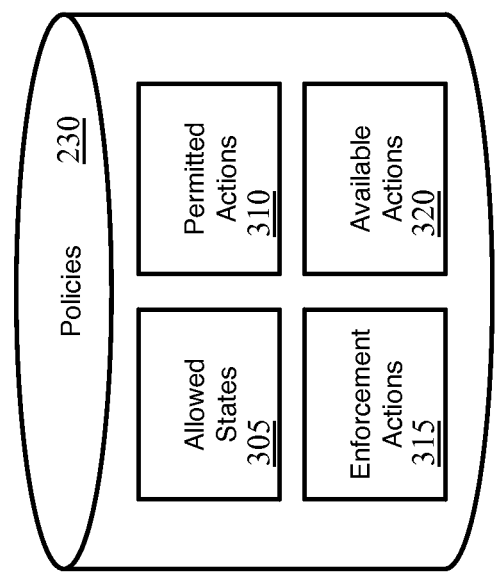
FIG. 3 illustrates that the policies of some embodiments include allowed states, permitted actions, enforcement actions, and available actions.

The policy manager 210 is responsible for managing, monitoring, and enforcing the policies 230. In some embodiments, the policies 230 includes up to four different types of user-specified policies, as shown in FIG. 3. FIG. 3 illustrates that the policies 230 include allowed states 305, permitted actions 310, enforcement actions 315, and available actions 320, which may be used separately or in concert by the policy manager 210.

The allowed states 305, sometimes referred to as classification policy, specifies which states of the network comply with the real-word policy. In this case, the particular actions that were taken to arrive at a particular state (e.g., API calls that modify the network state) are not relevant to the policy. Instead, the policies 305 only evaluate the current state. In some embodiments, the policies 305 are written in terms of identifying violations (i.e., determining when a state is not policy-compliant and writing a data tuple to a table that keeps track of such policy violations). Thus, the allowed states policy 305 is primarily concerned with monitoring and reactive enforcement.

The permitted actions 310, sometimes referred to as access control policy, control which actions are permitted to be executed by which users in which states. Whereas the allowed states 305 are concerned with the states that result from actions already taken, the permitted actions 310 handle proactive enforcement by determining whether a particular action is allowed. In some embodiments, the permitted actions 310 are written as allowing a particular action to change specific state data when the combination of the current state and the state to be modified meets specific conditions (and, conversely, prevents the particular action when the combination of the current state and the state to be modified fails to meet these conditions).

The enforcement actions 315 specifies which actions the policy management system 200 should take in which states in order to enforce policy. Whereas the allowed states 305 and permitted actions 310 policies are descriptive, the enforcement actions 315 policy is prescriptive. That is, the allowed states 305 and permitted actions 310 describe what states and actions are permitted for other services, the enforcement actions 315 specify which actions the system 200 itself should take (though the actions are then actually executed by one or more of the other services).

Finally, the available actions 320, sometimes referred to as cloud service policy, describes the various cloud services (e.g., the services 280-295) available to the system 200, including the actions that the policy management system 200 can execute through these services in order to change the network state. For each action, the stored policy information includes the details of the changes to network state that are expected should the particular action be executed.

In some embodiments, the policies 230 stored by the policy management system 200 include only the allowed states 305, permitted actions 310, and enforcement actions 315. In this case, the allowed states 305 are used by the policy manager 210 to monitor for violations in the network state by evaluating updates to the network state for such violations. When such violations occur, the policy manager uses the enforcement actions policy 315 to correct the violation (i.e., to modify the network state such that the violation no longer exists). The permitted actions 310 are used by the policy manager 210 for proactive enforcement, when one of the cloud services 280-295 sends a request to the policy management system 200 through the query API 245.

This setup enables the monitoring, reactive enforcement, and proactive enforcement by the policy manager 210, but also requires that the three types of policies 305-315 be highly synchronized. When the real-word policy changes (i.e., the rules that constrain the cloud change), three of the declared policies may require modification. That is, not only do the states that cause violations change, but the states under which specific actions must be taken for enforcement and under which actions are permitted or denied will be changed as well. In addition, to change the balance between proactive and reactive enforcement may require policy changes, as opposed to the administrator (policy-writer) simply encoding the policy once and allowing the system to determine how to enforce it.

In other embodiments, the policies 230 stored by the policy management system 200 include only the allowed states 305 and the available actions 320. In this case, the allowed states 305 are used by the policy manager in much the same way as for the first case, to monitor for violations in the network state by evaluating updates to the network state for such violations. When such a violation occurs, the policy manager 210 uses the available actions 320 to identify sets of corrective actions that remove the violation. If multiple different sets of corrective actions exist, then the policy manager 210 provides these options to an administrator for the administrator to select between them. In some such embodiments, the policy manager 210 caches the choice made by the administrator for future use. For proactive enforcement, upon receiving a request to determine whether a particular action is permitted, the policy manager 210 simulates the application of the particular action using the available actions 320 to create a simulated network state, then tests the simulated state for violations using the allowed states 305. If the simulated network state has additional violations, then the policy manager denies the execution of the requested action.

While the second example above (with only the allowed states 305 and the available actions 320) is the more flexible of the two, using the available actions requires a more complicated set of policies and in many cases more computation by the policy manager. Furthermore, the accuracy of the enforcement relies on the accuracy of the policy declarations defining the available actions 320 and their effects on the network state, which may be more difficult for a network administrator to get right than the permitted actions and enforcement actions policies 310 and 315. Thus, some embodiments begin with the allowed states and available actions policies, but also integrate permitted actions and enforcement actions policies to override and/or augment the monitoring and enforcement behavior of the policy manager.

Returning to the policy manager 210 of FIG. 2, in some embodiments the policy manager includes a table evaluation engine 250. The table evaluation engine 250 performs the table mapping operations, as specified by the policies 230, on the network state data 220, as events are received. An event may be a modification to the network state 220, as received through the data integration module 235, a modification to the violations data 225 based on previous operations performed by the table evaluation engine 250, a request to perform a particular action received through the query API 245, etc.

As described in further detail in the following section, the table evaluation engine 250 of some embodiments performs table mappings according to a set of declaratory rules. The policy management system of some embodiments 200 includes a compiler (not shown in FIG. 2) that receives policies in the form of declaratory statements, then converts these into query plans for the table evaluation engine 250. Upon receiving an event, the table evaluation engine 250 follows the one or more query plans that specify operations (e.g., database join operations) to perform based on the event. The table evaluation engine 250 receives input tables and generates output tables according to the query plans; the output tables may specify violations, actions to execute, data to send to the administrator through the API 215, etc.

The administrator API 215, in some embodiments, provides an interface for an administrative dashboard that identifies policy violations to a user, provides explanations as to the causes of the violations and possible corrective actions, and receives selections of corrective actions to take. In some embodiments, the administrator API 215 also provides simulations of changes to the network state if corrective actions are taken. That is, when the policy manager 210 detects a violation, some embodiments also compute the possible corrective actions (e.g., according to the available actions policies), and provide the violation and possible actions to the administrator API 215, which generates the dashboard user interface for viewing by the administrator. In some embodiments, either the policy manager 210 or the administrator API 215 performs the computations to simulate the corrective actions' effects on the network state 220, so that this information can also be presented to the administrator via the dashboard. When the administrator provides a selection of a corrective action, in some embodiments the API 215 modifies the policies to cache this decision, such that future violations of the same type will be handled in the same manner without need for administrator intervention.

Figure 4:
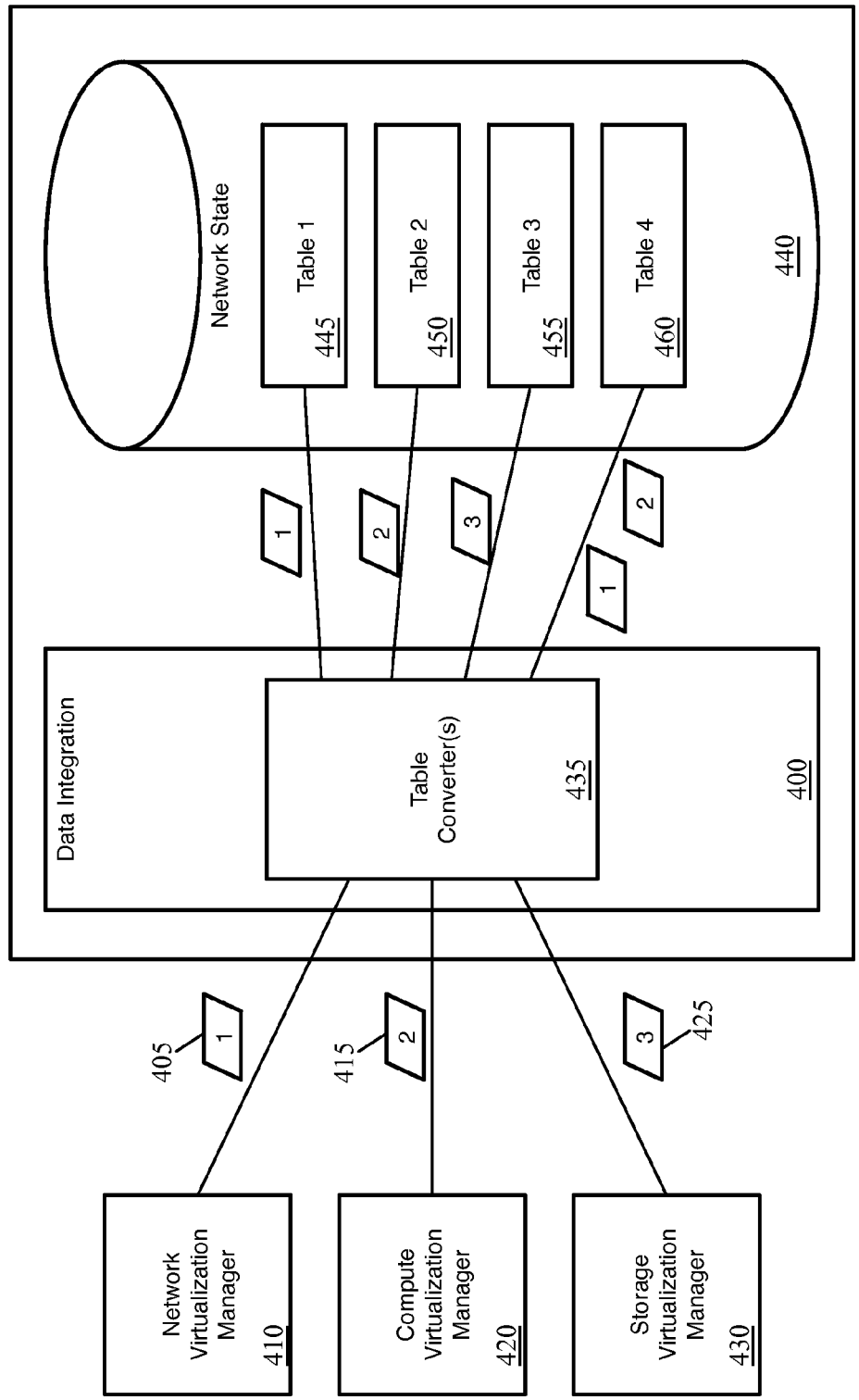
FIG. 4 conceptually illustrates the operation of a data integration module of some embodiments.

The above describes the various components of the policy management system architecture of some embodiments. Subsequent figures, in both this section and the following sections, will describe some of these components in greater detail, as well as describe the operation of the system 200. FIG. 4 conceptually illustrates the operation of a data integration module 400 of some embodiments. The data integration module 400 is similar to the module 235 in some embodiments, and provides a unified interface for all of the data sources upon which the various policies operate.

The example of FIG. 4 illustrates the data integration module 400 receiving a first set of state data 405 from a network virtualization manager 410, a second set of state data 415 from a compute virtualization manager 420, and a third set of state data 425 from a storage virtualization manager 430. In some embodiments, these data are state updates from heterogeneous sources. For instance, the set of state data 405 could be the existence of a new logical network and various information about that logical network, the set of state data 415 could be the existence of a set of new VMs that are connected to the aforementioned new logical network, while the set of state data 425 might be unrelated information about a new storage network. In some embodiments, the sets of state data 405, 415, and 425 are in different, heterogeneous formats when received by the data integration module 400. In other embodiments, the various cloud services 410, 420, and 430 are responsible for providing the data in a homogeneous, unified format (e.g., as a set of SQL-like insert, delete, and/or replace commands).

As shown, the data integration module 400 includes a table converter 435. The table converter 435 of some embodiments is responsible for receiving the network state data from the various cloud services and converting the data into the tables stored in the network state data 440. When the data is received in heterogeneous formats, the table converter 435 may include different modules for converting data from different types of cloud services, in order to store the data in a unified format. Upon conversion of the data, the table converter 435 identifies the appropriate tables for the new state update, and modifies the tables to include the new data tuples or to remove data tuples designated for deletion. In other embodiments, the table converter 435 receives the commands from the cloud services with the state updates, identifies the appropriate table(s), and modifies the tables without needing to convert the data from a different format.

As shown in the example, the network state storage 440 includes four tables 445-460. These tables 445-460 store different types of network state data regarding the cloud managed by the policy management system. The table converter 435 stores the first set of network state data 405 into the first table 445 (e.g., a table listing all the logical networks present in the cloud and their owners), the second set of network state data 415 into the second table 450 (e.g., a table listing all the VMs present in the cloud), and the third set of network state data 425 into the third table 455 (e.g., a table listing all the storage networks present in the cloud). In some embodiments, a particular state update will be stored in multiple tables. For instance, if the data integration module 400 receives data from the compute virtualization manager indicating a new VM with a particular owner attached to a particular logical network, some embodiments might store this data in (i) a table listing all the VMs, (ii) a table pairing the VMs with their owners, and (iii) a table paring the VMs with the networks to which they are connected).

In addition, the example of FIG. 4 illustrates that the state data 405 and 415 are both used to populate the fourth table 460. In some embodiments, some of the stored network state 440 includes tables populated from heterogeneous data sources. That is, the table converter may include instructions to populate some tables with data from multiple different cloud services. On the other hand, some embodiments store all of the incoming data in separate tables based on the source of the data (i.e., the table converter does not store data from multiple sources in a single table. However, the policies enforced by the policy manager might generate additional tables that combine data from several sources (i.e., from several tables, using database join operations). Thus, for example, a policy that looks at VM and network ownership might generate a table of VM-network pairs that have owners in the same group by combining state data received from a group directory, the network virtualization manager 410, and the compute virtualization manager 420.

II. Policy Declarations

As described, the policy management system of some embodiments receives policy declarations (e.g., from cloud administrators) as a set of declarative statements that indicate actions to take when a set of conditions are met. These actions could be to note the existence of a violation of policy (e.g., by writing a new data tuple into a table that stores violations), to act upon such a violation of policy (by commanding a cloud service management application to take a particular action, or by presenting a set of possible actions to an administrator through a user interface), or to determine whether a potential action that modifies the network state should be permitted. In some embodiments, the declarative statements set forth the action to take if the set of conditions are all true. That is, the declarative statements are of the form Take Action IF A=true AND B=true AND C=true.

Each of the conditions, in some embodiments, is a statement about the existence of a data tuple in a particular table. For example, a policy that determines whether a particular VM is in violation of a policy includes a statement that the VM is listed in a table of VMs, along with other conditions about the VM, the network to which it is connected, etc. The policies, in some embodiments, allow for the definition of additional tables that may be used in the determination of policy violations. For instance, in order to determine whether a VM owner and a network owner are in the same group, a policy might define a table listing pairs of owners that are in the same group; this table definition is itself an action (add pair to table) taken when a particular set of conditions are met (owner A is in a particular group G AND owner B is in the same particular group G).

In some embodiments, the policy management system includes a compiler that generates a query plan to execute based on the declarative instructions contained in the policy. For example, in some embodiments, a set of three conditions (the A & B & C example given above) results in three different sets of join operations, each performed if one of the three different conditions occurs. That is, if a state update indicates that B has occurred, the generated query plan specifies to also join A and C, and select at least a portion of the results of the join operation for output to a different table, or to use the results as the parameters of a specific action. In some embodiments, a compiler module within the policy management system handles the generation of query plans based on declarative instructions.

Figure 5:
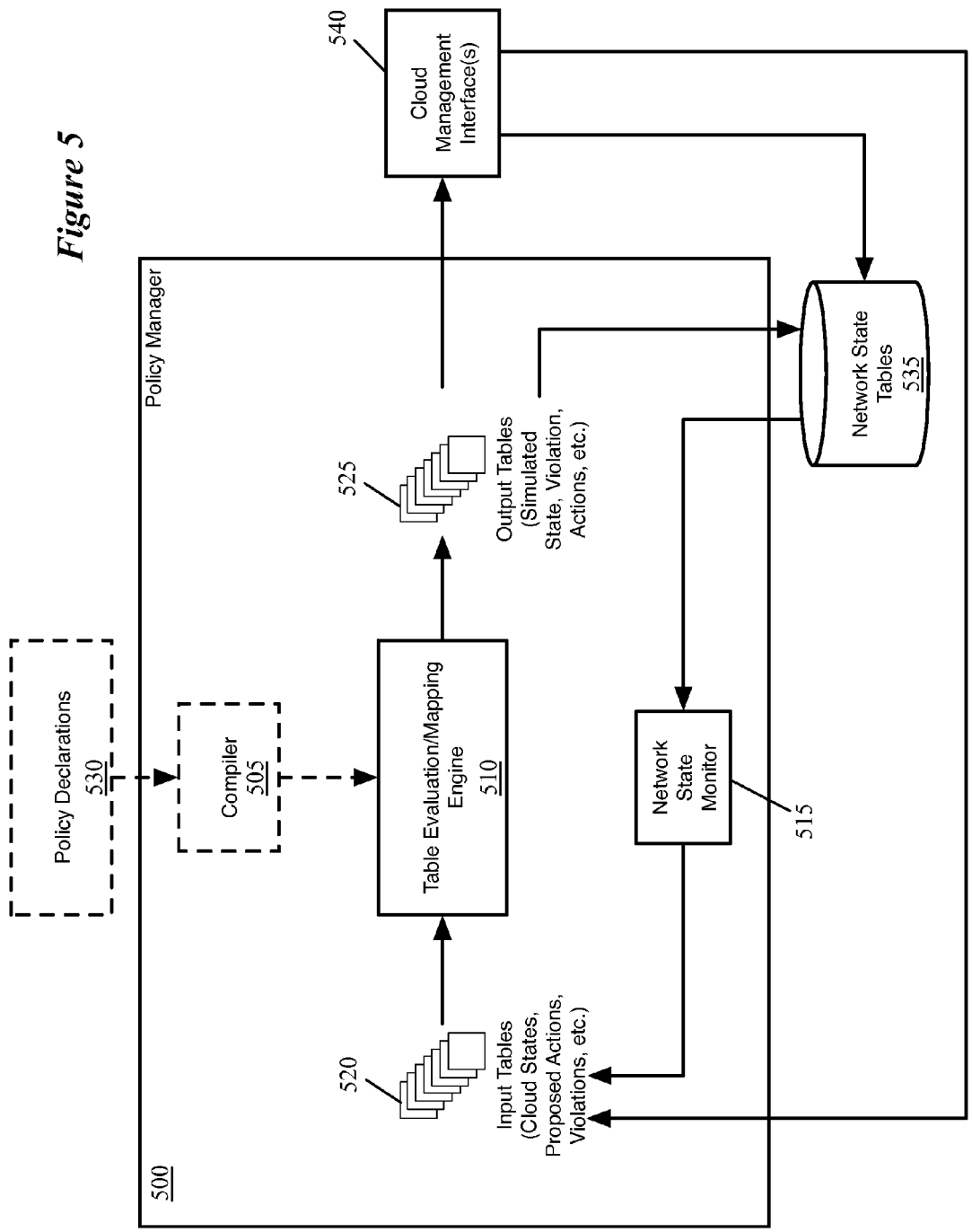
FIG. 5 conceptually illustrates the operation of a policy manager.

FIG. 5 conceptually illustrates the operation of a policy manager 500, similar to the policy manager 210 from FIG. 2. The policy manager 500 uses a table evaluation/mapping engine 510 to map input tables 520 to output tables 525. The input tables 520 may include the network state data, proposed actions to be taken by a cloud service, violations identified by previous table mapping operations, etc. The output tables 525 may include violations of policy, actions to execute, simulated actions, etc.

As shown, the policy manager 500 includes a compiler 505, a table evaluation engine 510, and a network state monitor 515. The compiler 505 of some embodiments takes a relatively small set of declarative instructions 530, specified in a declarative language, that form a policy, and converts these into a larger set of code that specifies the operation of the table evaluation/mapping engine 510. As such, the use of a compiler for declarative language greatly simplifies the process of defining and updating the policy for the policy developer (e.g., the cloud administrator).

In some embodiments, the language used by the policies (whether these policies be allowed states, enforcement actions, permitted actions, or available actions) is an incarnation of Datalog/Prolog, which describes how to construct new tables from existing tables. The grammar of some embodiments is as follows:

```
<policy> ::= <rule>*
<rule> ::= <head> IF <literal> (COMMA <literal>)*
<head> ::= <atom>
<head> ::= <modal> LSQUARE <atom> RSQUARE
<modal> ::= INSERT | DELETE | EXECUTE | PERMIT
<literal> ::= <atom>
<literal> ::= NOT <atom>
<atom> ::= NAME LPAREN <term> (COMMA <term>)* RPAREN
<term> ::= INTEGER | FLOAT | STRING | VARIABLE
```

This grammar indicates that a policy is a set of rules and that each rule is an if statement (i.e., each rule is structured as a new data tuple to output if a set of conditions, separated by commas, are true). The data tuple to output can be a simple condition or an action to perform (either inserting, deleting, executing, or permitting a data tuple, indicated by square brackets). The conditions are indicated by names (e.g., table names) followed by standard parentheses around sets of terms, which represent the existence or non-existence of data tuples in the named table. The following discussion will include various examples of these policies according to some embodiments.

The table evaluation engine 510 carries out the rules specified by the policy declarations 530 and encoded by the compiler 505. Specifically, the table evaluation engine 510 of some embodiments processes input events according to query plans generated by the compiler 505 to generate output data tuples that are then stored in the tables. As further described below, each query plan is generated by the compiler 505 from a declaratory rule specified by the policies 530.

The table evaluation engine 510 detects events based on the network state monitor 515 identifying changes to the network state tables 535 (which store the current state of the network) and the cloud management interfaces(s) 540 (e.g., the query API 245) forwarding requests for permission to execute actions from one of the cloud interfaces. The network state monitor 515 listens on the network state tables 535 for any changes to the tables, and provides these changes as input events to the table evaluation and mapping engine 510. These changes may include state updates received from the cloud services (as shown in FIG. 4) or the output of previous table mapping operations received from the table evaluation engine. For instance, when the table evaluation engine 510 identifies a violation, the engine stores the existence of the violation to a specific table in the network state 535. This change will, in some embodiments, cause the network state monitor 515 to identify another event to pass to the table evaluation engine 510.

While this scenario describes permission requests as forwarded by the cloud management interface 540 directly to the table evaluation engine 510 as input tables 520, in some embodiments the interface 540 actually writes the request to the network state tables 535 (e.g., in a specially-designated table for such requests. In this case, the network state monitor 515 identifies the change to the network state 535 and passes this to the table evaluation engine 510.

In the case of permission requests, the table evaluation engine 510 of some embodiments passes its output 525 to the cloud management interface (e.g., a query API 245). This allows the interface to return a response to the requesting cloud service to indicate whether the cloud service can perform its requested action without causing violations. Similarly, if the result of the table evaluation engine 510 is to perform an action (i.e., to direct a particular cloud service to perform an action), in some embodiments the engine also passes this data to the cloud management interface 540 (e.g., an action executor 240).

A. Query Planning

As mentioned above, in some embodiments the policy manager uses a variation of the Datalog language to direct the table evaluation/mapping engine to execute the declared policies. As indicated by the grammar shown above, the policy manager provides a few declaratory rules and operators that allow a policy developer to specify different operations for the table evaluation engine to perform upon the occurrence of different events. The declaratory rules and operators that are specified through this grammar are then compiled into a much larger set of rules by the compiler. In some embodiments, this compiler translates each rule that is meant to respond to an event into several sets of database join operations. Collectively, the larger sets of rules that implement the policies form the table evaluation and mapping engine.

Figure 6:
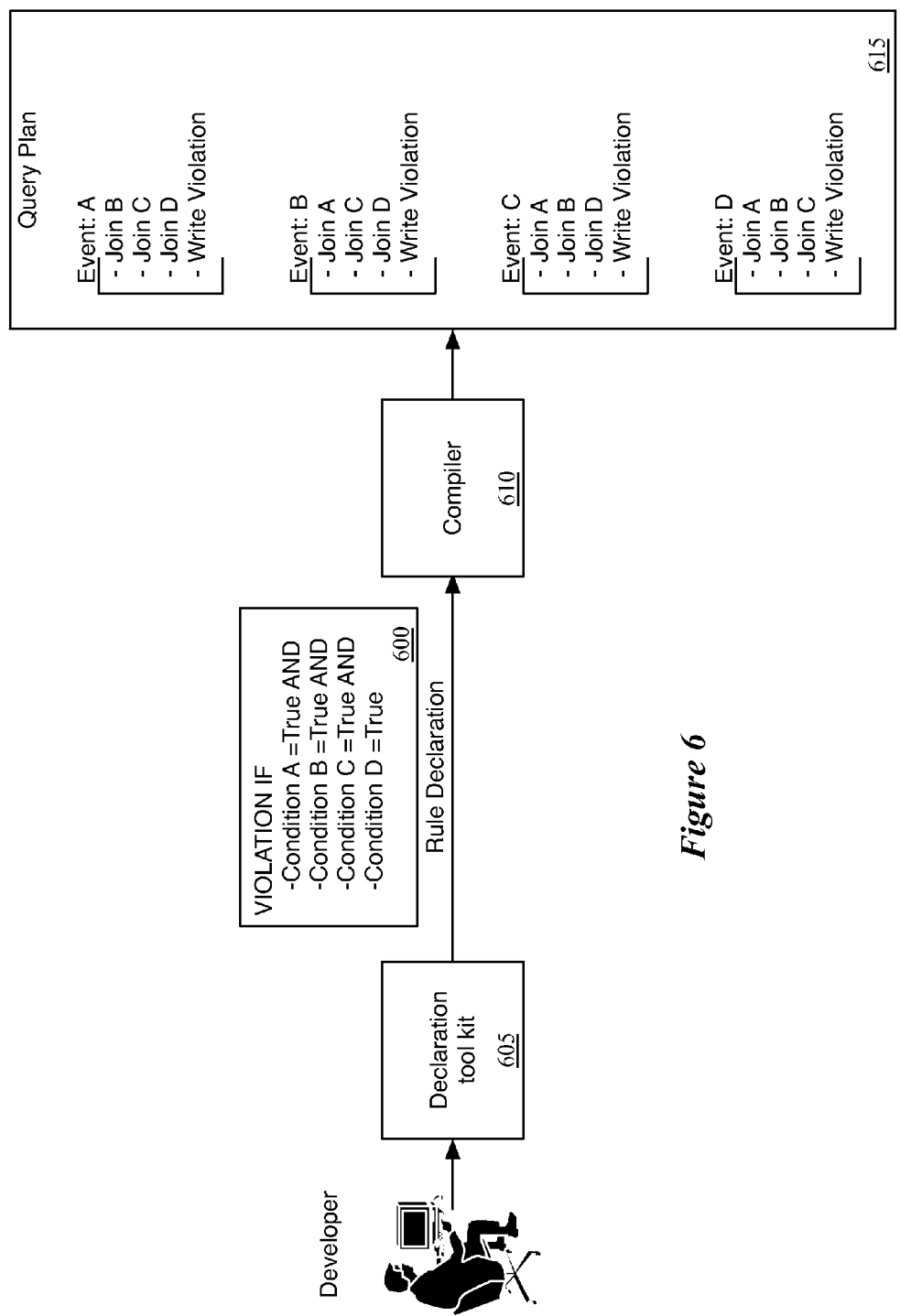
FIGS. 6-8 conceptually illustrate a development process that some embodiments employ to develop rules based on different types of policy inputs.
Figure 7:
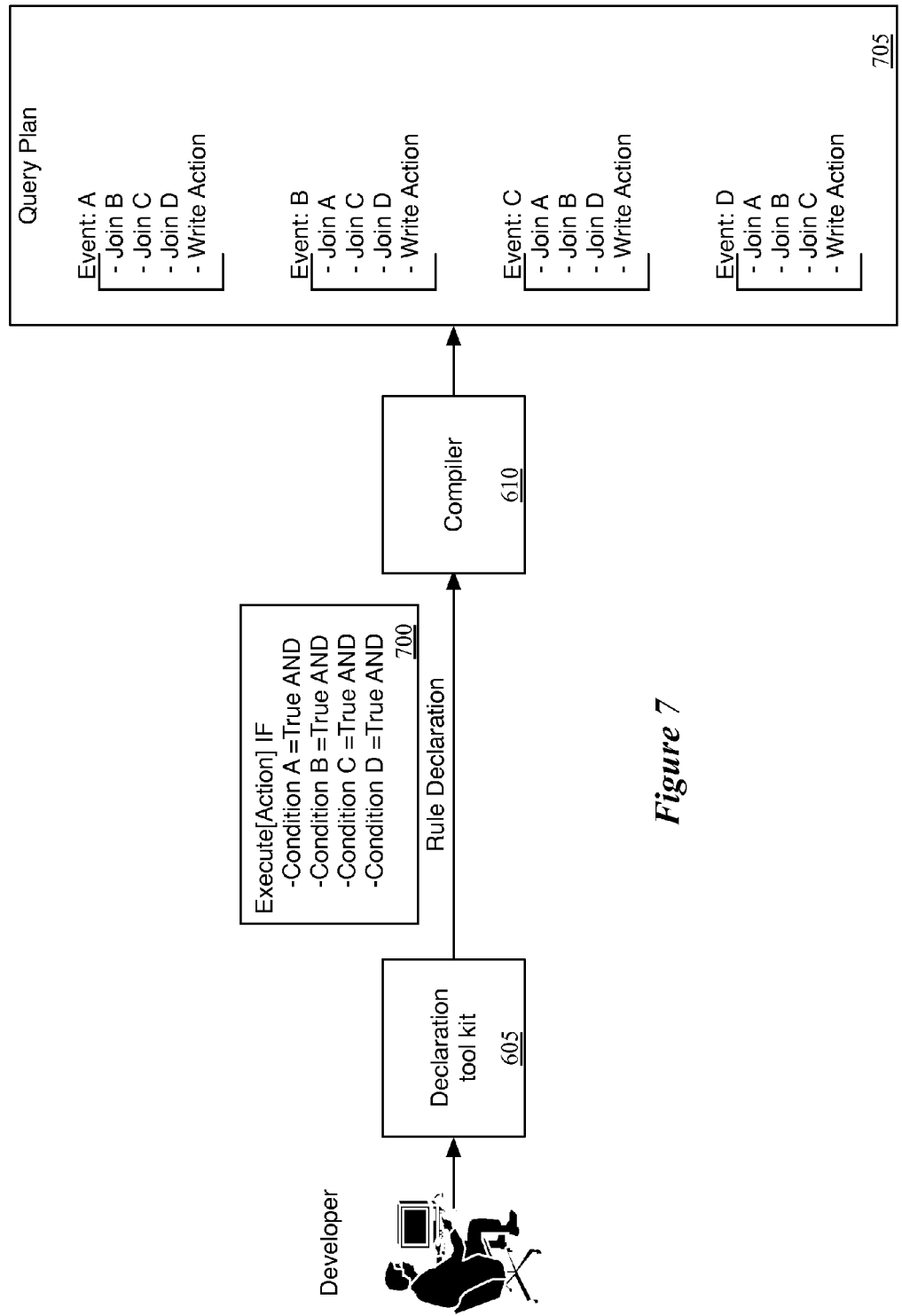
Figure 8:
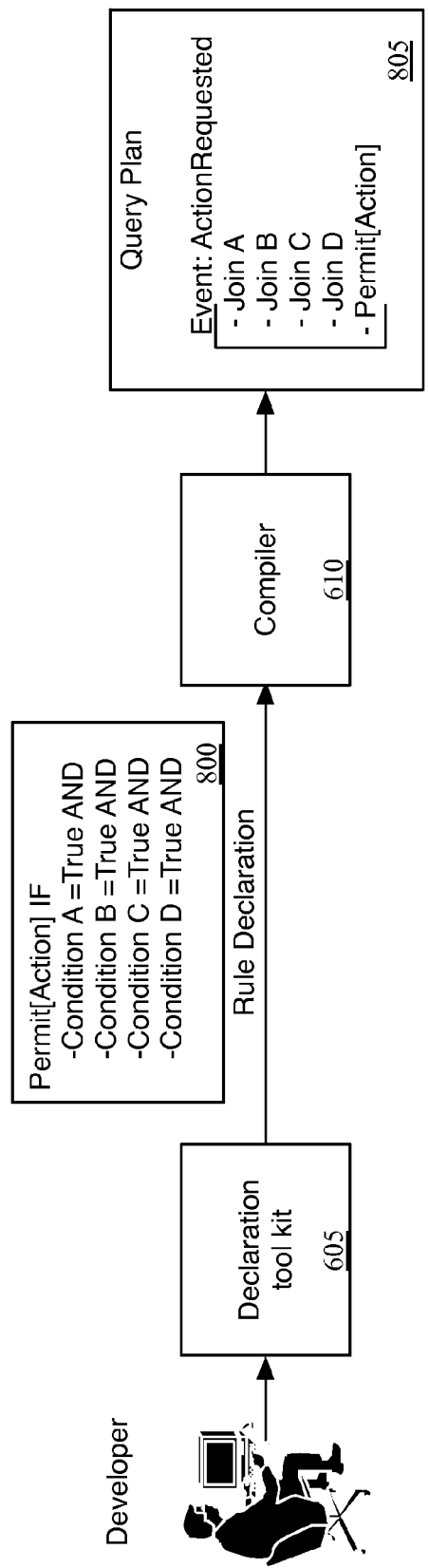

FIGS. 6-8 conceptually illustrate a development process that some embodiments employ to develop these rules based on different types of policy inputs. Specifically, FIG. 6 illustrates an allowed states policy that detects a violation, FIG. 7 illustrates an enforcement action policy that corrects a violation with a particular action, and FIG. 8 illustrates a permitted actions policy that provides permission for a cloud service to take a requested action.

As shown in FIG. 6, the development process uses a declaration toolkit 605 and a compiler 610 (e.g., the compiler 505 of FIG. 5). The toolkit 605 allows a developer (e.g., a developer of policy, such as a cloud administrator) to specify different policies, including allowed states policies, enforcement actions policies, permitted actions policies, and available actions policies. These policies specify different sets of rules that output different operations upon the occurrence of different sets of conditions.

This example, as well as the two subsequent examples of FIGS. 7 and 8, illustrate one of several different approaches to query planning Specifically, the query planning for these types of policies can be implemented in at least three different approaches, one of which is shown in these examples. These examples use a N Log approach, which tends to require more memory, but handles recursion in the policy language and tends to be better at computing changes in tables. Some embodiments use a database approach, which uses less memory than the N Log approach and handles recursion well, but also spends more computation time. Some other embodiments use a Prolog approach to query planning, which often uses even less memory but does not handle recursion well (or at all) and may be more difficult for the policy developer to understand. The policy manager of some embodiments may mix and match between these approaches. For example, a developer might start off with the Prolog version of query planning, but migrate to the other versions as appropriate. In some cases, the policy manager will be able to use different query planning approaches on different policies, or even different portions of a policy.

FIG. 6 illustrates an example of an allowed state policy 600. This example is a rule that states that a violation has occurred if four conditions A, B, C, and D are all true. The expression of each condition as true in this example is not meant to convey that all embodiments express each condition for each rule as true or false. For some embodiments, this expression is meant to convey the concept of the existence of a condition. For example, in some embodiments, the conditions "A=True" might actually be written as "record A exists in table with specified values". Thus, an example of such a rule might read as follows:

```
violation(vm) IF
    nova:virtual_machine(vm) AND
    nova:network(vm, network) AND
    not neutron:public_network(network) AND
    neutron:owner(network, netowner) AND
    nova:owner(vm, vmowner) AND
    not same_group(netowner, vmowner)
```

In this example, the rule specifies to add a row to a reserved table called "violation" any time a VM exists that is defined and is attached to a network that is neither a public network nor a private network the owner of which is in the same group as the owner of the VM. In the declarative language, the table names are nova:virtual_machine, neutron:owner, etc., which specify the source (e.g., nova, neutron) of the network state data as well as the type of data. The declaration also uses a table (same_group) that combines data from multiple sources and must be generated by the table evaluation engine (and therefore defined by the policy) prior to performing the violation determination.

As shown in the figure, the compiler 610 converts the rule 600 specified by the developer using the declaration toolkit 605 into a query plan 615 of the table evaluation engine. Each query plan includes one or more sets of join operations, in some embodiments, each of which specifies one or more join operations to be performed upon the occurrence of a particular event in a particular input table. In this case, the four conditions result in four sets of join operations.

In some embodiments, each set of join operations is specified for execution upon the detection of the occurrence of one of the conditions set forth in the rule. That is, the event for which the set of join operations is specified is one of the conditions of the multi-conditional rule. Thus, because there are four conditions for rule 600, the query plan 620 includes four sets of join operations precipitated by four different events. One of the sets of join operations is performed when the policy manager detects a change in the network state resulting in condition A, another of the sets of join operations is performed when the policy manager detects a change in the network state resulting in condition B, etc.

These four sets of join operations collectively represent the query plan 615 that the table evaluation and mapping engine performs upon the occurrence of an event corresponding to any of the conditions A, B, C, and D. When the policy manager receives an event corresponding to one of the conditions, but the other conditions are not meant, then the set of join operations fails and no output table is modified (e.g., in the above example, if the owner of the VM and the owner of the network are in the same group). On the other hand, when all of the conditions are true, then the set of join operations succeeds and an output table is modified to perform the specified action. For example, in the case of allowed states policies such as the policy rule 600, the action is to write a particular value to the violation table that keeps track of existing violations. That is, if each of the four conditions is true, then the rule indicates that a violation exists and the query plan specifies to write that violation to a table. In the example given above, the table is a list of VMs that violate one or more policies. In some embodiments, the violation table stores additional information, such as an indication of what policy is violated.

FIG. 7 illustrates an example of an enforcement action policy 700. This example is a rule that states to execute a particular action if four conditions A, B, C, and D are all true. In some embodiments, any allowed state policy that specifies a violation may have an equivalent enforcement action policy with the same conditions. In this case, the resulting query plan 705 generated by the compiler 610 has the same four sets of join operations as the query plan 615 from the previous figure. However, rather than writing to a violation table, the query plan specifies that if the conditions are met, to write to an actions table. Such a table, in some embodiments, has rows that indicates actions for the policy management system to execute (i.e., by directing one of the attached cloud services to perform the action). An example of such a rule, given the same policy as used above (that a VM should only be connected to a public network or a private network the owner of which is in the same group as the owner of the VM), is as follows:

```
execute[disconnect_network(vm, network)] IF
    nova:virtual_machine(vm) AND
    nova:network(vm, network) AND
    not neutron:public_network(network) AND
    neutron:owner(network, netowner) AND
```

```
nova:owner(vm, vmowner) AND
not same_group(netowner, vmowner)
```

In this example, the rule specifies to execute an action to disconnect the VM from a network when the VM is in violation of the aforementioned policy. A policy manager with both of these policies specified would both record the violation and execute the action. In some embodiments, the policy writer might write a policy using the violation table. However, the rule:

```
execute[disconnect_network(vm, network)] IF
    violation(vm) AND
    nova:network(vm, network)
``` might not work if there are other reasons that a VM could be written into the violation table. On the other hand, if the above allowed states policy is the only way for a VM to be written into the violation table, then the above rule would execute the enforcement actions policy correctly, and would generally not need to be modified if the conditions on the policy changed slightly. While the above execute action could theoretically result in infinite loops (as the policy manager repeatedly issues the disconnect_network action then re-examines policy to determine that the action is still required), by only evaluating policy upon receiving updates to the network state, the action will only be executed when one of those updates is the direct cause of the action.

Finally, FIG. 8 illustrates an example of a permitted actions policy 800. This example is a rule that states that a particular requested action may be executed by a cloud service if four conditions A, B, C, and D are all true. In this case, the resulting query plan 805 generated by the compiler 610 only has one set of join operations precipitated by one event. Specifically, when the compiler 610 of some embodiments receives a permitted actions policy rule, the compiler determines that the event that causes the performance of the join operations is the receipt of an action request. In some embodiments, the network state tables include a requested actions table, to which the cloud service interface (e.g., the query API) writes each requested action in order for the policy manager to detect the update and generate a new event.

As the rule 800 specifies to permit the action if all four conditions A, B, C, and D are true, the query plan includes the four join operations to join these four conditions. If the join operations fail (because one of the conditions is not true), then the action will not be permitted. On the other hand, if the join operations succeed, that means that the action is permitted and the policy management system can return a response to the requesting cloud service permitting the action. To do this, in some embodiments, the table evaluation and mapping engine writes a new record in a permitted actions table specifying that the requested action is permitted, allowing the query API to respond. In other embodiments, the table evaluation and mapping engine simply writes to the API without storing the information in a separate table.

Using the same example as above regarding constraints on connecting a VM to a network, the following two permitted actions rules in conjunction will implement the same policy in a proactive manner:

```
permit[connect_network(vm, network)] IF
    nova:virtual_machine(vm) AND
    nova:network(vm, network) AND
    neutron:public_network(network) AND
permit[connect_network(vm, network)] IF
    nova:virtual_machine(vm) AND
    nova:network(vm, network) AND
    neutron:owner(network, netowner) AND
    nova:owner(vm, vmowner) AND
    same_group(netowner, vmowner)
```

In addition to the types of policies shown in FIGS. 6-8, the compiler 610 of some embodiments also compiles available actions policy rules. As mentioned above, these policies describe the effects each executed action has on the network state database tables. That is, for each action, the policy describes which rows of which tables would be inserted/deleted if the action were executed. For instance, the above action disconnect_network(vm, network) would delete the row (vm, network) from the nova:network table that lists the connections of VMs to networks. Such an action would be written in the policy declarations as follows:

```
delete[nova:network(vm, network)] IF
    disconnect_network(vm, network)
```

Each action can insert and/or delete multiple rows from multiple tables, which requires either several such policy rule declarations (i.e., one for each data tuple affected) or the allowance of multiple actions (i.e., statements of the type Action[X] AND Action[Y] IF A). Furthermore, as with the other types of policies, the available actions policies can list multiple conditions after the IF statement. For example, a declaration for deleting a vm might be written as follows:

```
delete[nova:network(vm, network)] IF
    delete_vm(vm) AND
    nova:network(vm, network)
```

That is, the policy specifies to delete the network-VM connection if the delete vm action is executed and if the VM is connected to a network.

B. Computations Using Available Action Policies

Whereas the violation tables (the output of the allowed actions) are stored explicitly in the network state in order to keep track of violations on an ongoing basis, in some embodiments the output of the available actions policies are computed on demand in order to simulate a state (e.g., in volatile memory). To simulate the execution of a given action (or set of actions), the policy manager of some embodiments utilizes the available actions policy to compute which data tuples would be added or deleted if the given action were executed. In general, the result of such a simulation is a collection of rows that would be added and rows that would be deleted of various tables. The policy manager can then apply those insertions and deletions to the current network state to compute the new state (at least in its temporary storage for simulations). In some embodiments, the policy manager makes the modifications to the network state data stored by the policy management system until such time that the changes would be rolled back.

In order to compute a list of possible remediations for an identified violation using the available actions, the policy manager of some embodiments first rewrites the violation data tuple using the allowed states policy in terms of the network state tables (i.e., backward-chaining/abduction/query rewriting), in order to generate a logical formula that describes all the causes of the policy violation. In the network connection/ownership example, if the violating VM is "VM1" owned by "Al" and the network is "netA" owned by "Bob", then the logical formula computed by the policy manager would be:

```
nova:virtual_machine("VM1") AND
nova:network("VM1", "netA") AND
neutron:owner("netA", "Bob") AND
nova:owner("VM1", "Al") AND
not (exists g. ad("Al", g), ad("Bob", g))
``` in which the last portion of the formula is generated based on the definition of the same_group table.

The policy manager of some embodiments next rewrites the logical formula using the available actions policies in terms of the actions available (i.e., backward-chaining/abduction/query-rewriting) to generate a collection of action instances that when executed add or delete enough data tuples from the network state to cause the original policy violation to be removed from the violations table. In the ongoing example, two potential sets of actions could be constructed that would remedy the problem:

```
1.  disconnect_network("VM1", "netA")
2.  add_group("Al", "group1") AND
    add_group("Bob", "group1") AND
    create_group("group1")
```

The first of these sets of corrective actions disconnects the offending VM from its network, while the second set of actions creates a group with both the network owner and VM owner, such that the VM is still connected to the network but not in violation of the policy.

The result is, for each potential remediation, a collection of actions that when executed in some order should bring about the changes required to eliminate the violation. The policy manager, in some embodiments, will find the ordering for each collection of actions is such an ordering exists. Thus, the policy manager searches for an ordering on the actions that achieves the appropriate change in the violations table (i.e., the deletion of the violation tuple). In the first example, as there is only one action (disconnect_network). However, the second example requires that the create_group action be performed before the two add_group actions, as "Bob" and "Al" cannot be added to a group that does not yet exist. To identify the ordering, some embodiments simulate the different possible orderings in order to identify one that works.

III. Proactive and Reactive Enforcement

As mentioned above, in some embodiments, the policy management system has the ability to perform both proactive and reactive enforcement. While proactive enforcement may be optimal (to prevent the occurrence of violations of policy in the first place), it requires all actions taken by any of the cloud service to be vetted by the policy management system prior to the action being taken, which may not be feasible. Furthermore, some changes to the network state might occur on account of equipment failure or other reasons besides a cloud service management tool specifying an action. As such, some embodiments perform proactive enforcement of policy when possible, but combine this with reactive enforcement of policy when necessary.

In some embodiments, as described in Section I, the policy manager can perform proactive monitoring using the permitted actions policies and perform monitoring and enforcement with the allowed states and enforcement actions policies. On the other hand, the policy manager can also perform proactive monitoring by simulating states using the available actions policies and perform reactive monitoring using the allowed states and available actions policies. While this section describes the latter case (using the allowed states and available actions policies) in the flow charts of FIG. 9 and FIG. 12, one of ordinary skill in the art will recognize that other embodiments may use the enforcement actions and permitted actions policies, or a combination of the available actions policies with the potential to be overruled by permitted/enforcement actions policies.

Figure 9:
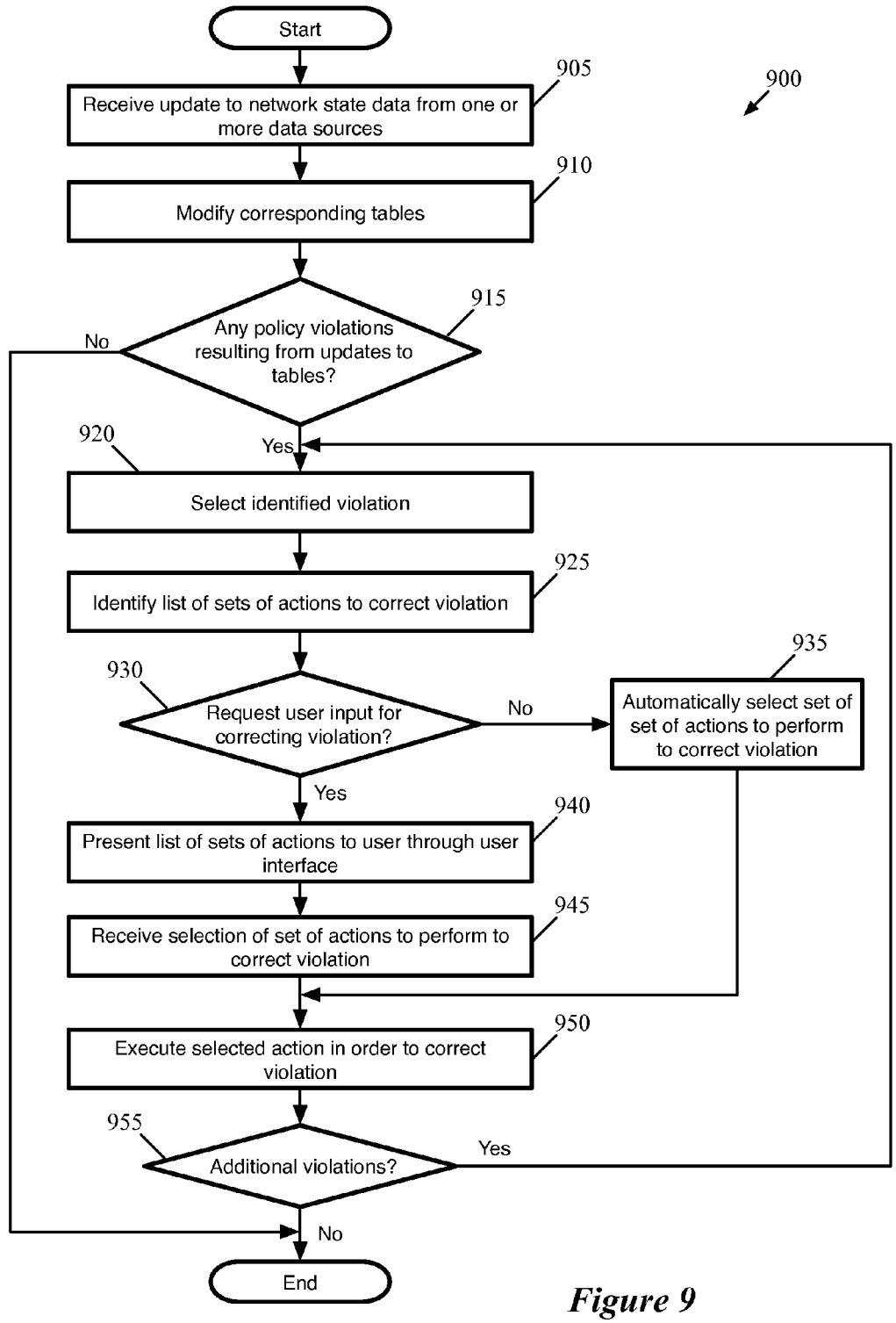
FIG. 9 conceptually illustrates a process of some embodiments for performing monitoring of policy violations and reactive enforcement of such identified policy violations.

FIG. 9 conceptually illustrates a process 900 of some embodiments for performing monitoring of policy violations and reactive enforcement of such identified policy violations. The process 900 is performed by the policy management system of some embodiments, in particular by a policy manager with a table mapping engine as described in the previous Section II. As noted in the above paragraph, the process 900 could be performed by a policy manager that uses allowed states policy rules and available actions policy rules.

As shown, the process begins (at 905) by receiving an update to the network state data from one or more data sources (i.e., from one or more cloud service applications). These data source may be a network virtualization manager, computer virtualization manager, storage virtualization manager, firewall or antivirus manager, group directory, etc. In some embodiments, as described above, these data sources send insert or delete commands to an interface of the policy management system that handles data integration, specifying the data tuples representing the network state that should be modified based on changes that the cloud service applications have either made or detected.

Based on the received update, the process modifies (at 910) one or more tables corresponding to the network state. As described in detail, some embodiments store the network state data as a set of tables. The tables store each pertinent data tuple as a row, or record. For example, the network state may include a table of VMs in the network, a table of VMs connected to networks, a table of logical network ownership, a table of storage network ownership, etc., for each type of data received from the cloud service data sources.

Next, the process determines (at 915) whether the updates to the tables result in any policy violations. Some embodiments include a monitoring module that listens on the network state data for updates, and reports these updates to a policy manager table mapping and evaluation engine that performs table mapping according to declared policies. Each update to the network state produces an event, and in some embodiments these events may correspond to sets of join operations that may indicate a violation of policy. When a new VM is added, the policy manager will compute numerous policy checks to determine whether the VM is in violation of any number of policies governing VMs (i.e., whether it is allowed to connect to its current logical network, whether its owner is permitted, whether it is located in a permissible data center, etc.). In some embodiments, the policy manager uses the allowed states policies to determine whether any violations exist. That is, each of these determinations is essentially the policy manager checking whether the current state of the network, after applying the updates, is allowed. When the network state update does not result in any policy violations (the ideal result), the process ends.

Otherwise, when the state update results in at least one policy violation, the process proceeds to the correction of these violations. As shown, the process selects (at 920) one of the identified violations. In some embodiments, upon detecting the violations, the policy manager writes each of the violations to the network state tables. Each of these violations then appears as a new event to the policy manager, leading to further table mapping operations dictated by the available actions policies. One of ordinary skill in the art will recognize that while FIG. 9 illustrates a linear process 900 that performs operations relating to one violation at a time, this process is merely conceptual. The policy management system of some embodiments may perform operations relating to multiple identified violations in parallel (e.g., displaying all of the violations and possible remediative actions to a user at once rather than the one-at-a-time process implied by this figure), and might perform operations relating to remedying one violation while also performing operations to detect other violations based on other state updates.

With a particular violation selected, the process identifies (at 925) a list of sets of actions that will correct a violation. In some embodiments, the process uses the available actions policies as well as the set of conditions that caused the violation (using the allowed states policy rule) to determine these sets of actions. In some cases, such as the example given in Section II in which a VM was connected to a network and the owner of the VM did not share group membership with the owner of the network, multiple different sets of actions will be determined as possibilities to remove the violation. These sets of actions may include only one action (e.g., disconnect the offending VM from its logical network) or multiple actions (e.g., create a new group, add VM owner to group, and add network owner to group).

Some embodiments present the various options to a cloud administrator through a user interface, allowing the administrator to determine how to correct the violation. On the other hand, when there is only one set of actions that will correct the violation, or if there is no need to ask the user to choose (e.g., because the user has previously cached a decision for the type of violation), some embodiments forego asking the administrator and instead automatically execute the action. Thus, the process next determines (at 930) whether to request user (administrator) input for correcting the selected violation.

When no input is required, the process 900 automatically selects (at 935) one of the sets of actions to perform to correct the violation, then proceeds to 950 (described below). The process might automatically select one of the sets of actions when there is only one such set determined at 925. In addition, some embodiments enable users to cache which of the several sets of actions to perform for certain types of violations. That is, the first time such a violation is identified, the user may be presented with the list of sets of actions. Upon choosing such a set of actions, the user can also choose to cache the selection, so that future violations need not be presented to the user. In addition, some embodiments automatically cache a decision if the administrator makes the same decision repeatedly (e.g., after a threshold number of times making the same decision for the same type of violation). Furthermore, in some embodiments, the administrator may use enforcement action policy declarations as a way to automatically choose a particular set of actions for a particular type of violation (i.e., a policy specifying that when the conditions for the violation are met, to perform the set of actions).

However, when there is no automatic selection, the process presents (at 940) a list of sets of actions to the user through a user interface. As mentioned above, the user interface, in some embodiments, is a dashboard that presents the various policy violations present in the network allows the user to drill down into these violations. In various embodiments, the user can view the causes of the violation, the different sets of actions that may correct the violation, the ramifications on the network state of selecting each of the sets of actions, etc.

At some point, the user provides a selection of one of the sets of actions (or, potentially, chooses an option to take no action and leave the violation). At this point, the process 900 receives (at 945) a selection of one of the sets of actions to perform in order to correct the violation. The user may provide this selection by selecting a button on the user interface, by entering a command through a command line, etc., depending on the nature of the user interface itself. In some embodiments, the selected action or set of actions is written into a table that stores actions to be executed. This table may be stored as part of the network state (e.g., materialized in a more permanent storage), or as a set of records in temporary memory.

Next, the process 900 executes (at 950) the selected set of actions. In some embodiments, executing the actions actually entails sending commands to the appropriate cloud services to execute the specified actions. For instance, if the user selects an option to disconnect a VM from a network, then the policy management system might send such a command to the compute virtualization manager. On the other hand, if the user selects an option to add the owner of a VM and the owner of a network to a new group, the set of commands for doing so might be sent to the group directory manager. As each command is sent, some embodiments remove the action from the table of actions to be executed. In addition, some embodiments modify the network state data based on the expected changes resulting from the actions once executed by the various cloud service applications. Other embodiments, however, do not make the changes to the network state data until the cloud service provides updated network state information after having effected the change.

After having dealt with the selected violation, the process 900 determines (at 955) whether any additional violations remain to be dealt with. If additional violations remain, the process returns to 920 to select the next violation. As noted above, this process is conceptual, and some embodiments may actually handle multiple violations in parallel, and present the violations to the user at the same time via the user interface. If all of the violations are dealt with, the process ends.

Figure 10:
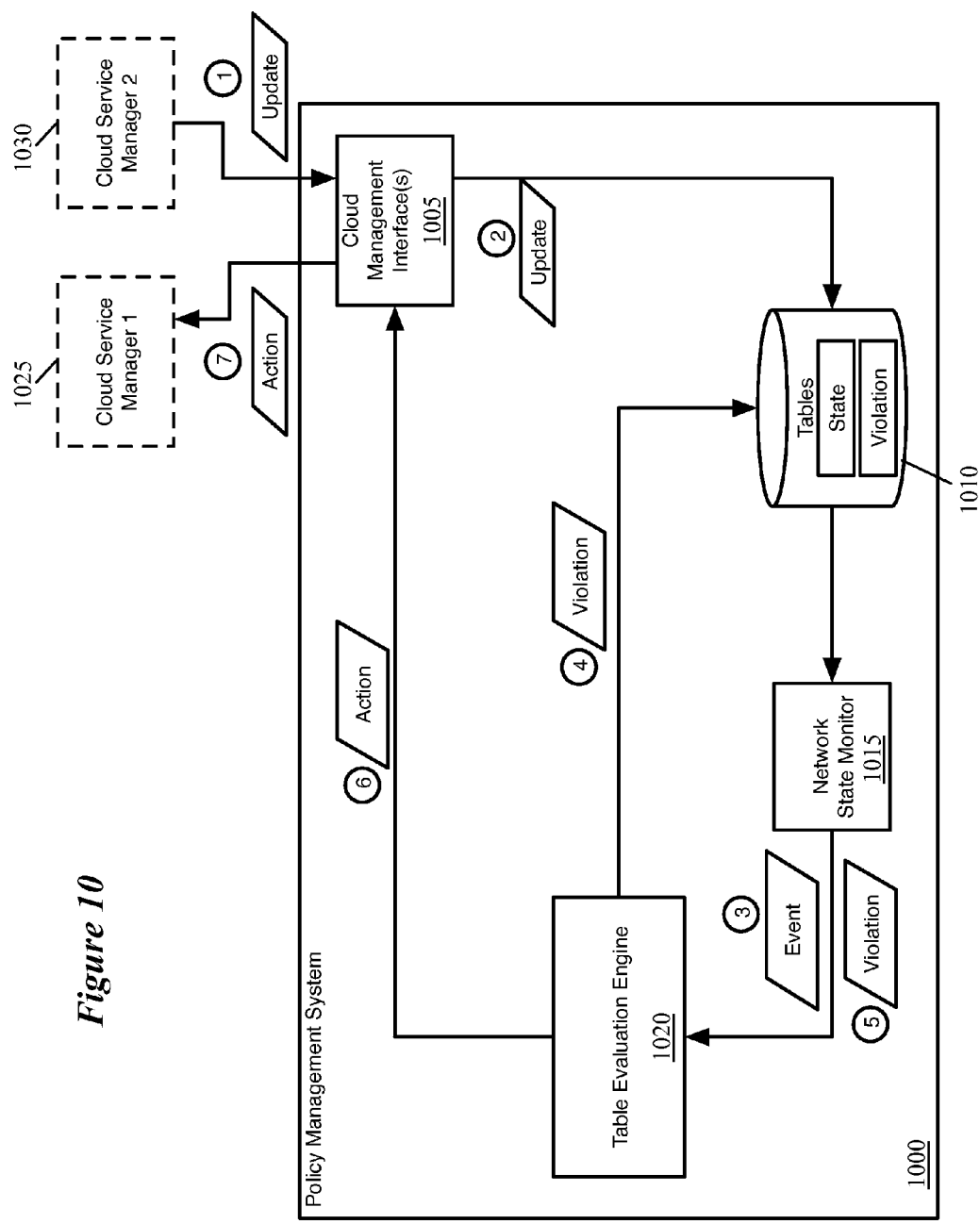
FIG. 10 illustrates an example of reactive policy enforcement that is performed automatically, without the need for user input.
Figure 11:
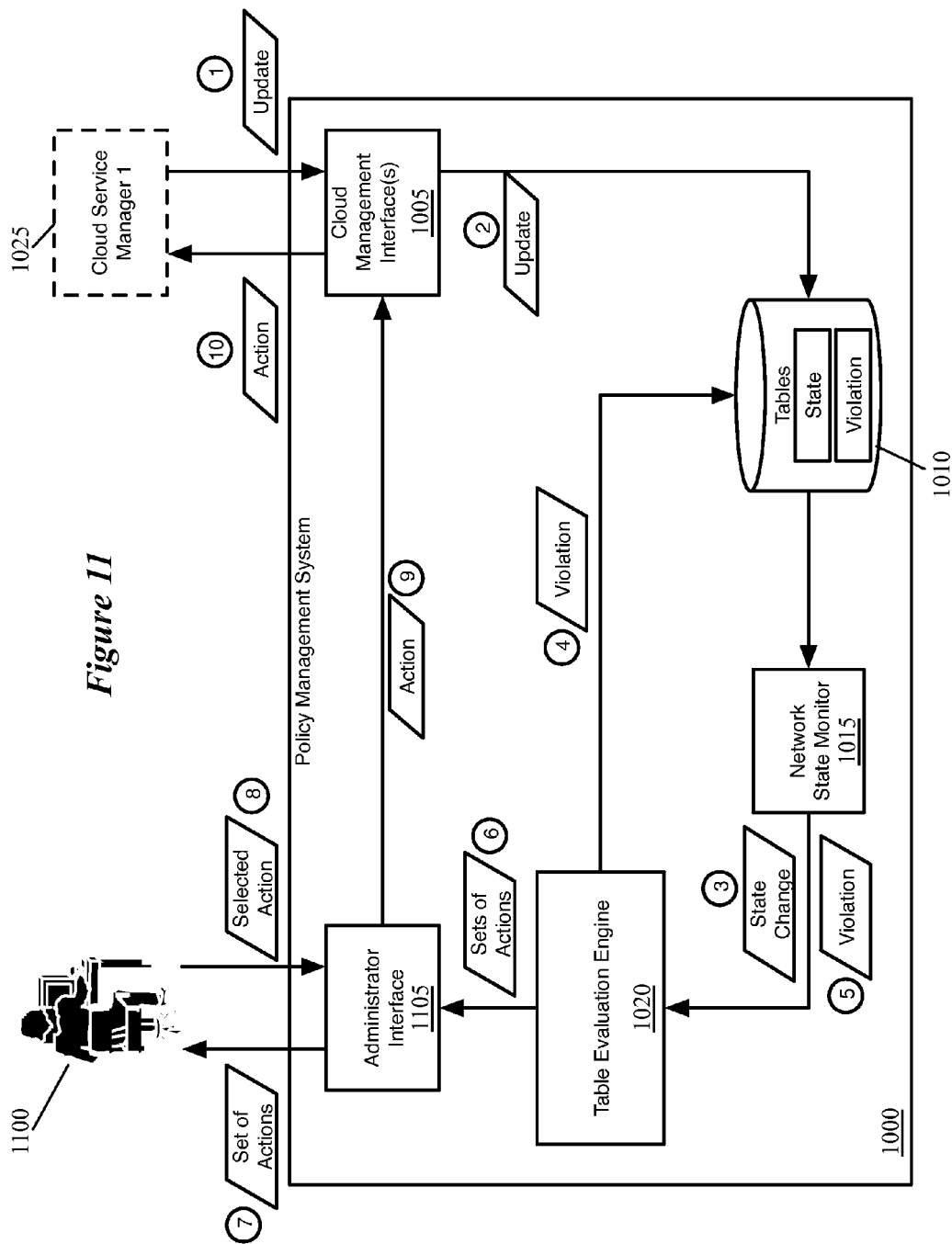
FIG. 11 conceptually illustrates the case in which an administrator provides input to select one of the sets of actions to perform.

FIGS. 10 and 11 conceptually illustrate the data flow through a policy management system 1000 of some embodiments for reactive and interactive policy enforcement in some embodiments. FIG. 10, specifically, illustrates an example of reactive policy enforcement that is performed automatically, without the need for user input. The policy management system 1000 includes a cloud management interface 1005, a set of tables 1010 (e.g., network state tables), a cloud state monitor 1015, a table evaluation engine 1020, and (as shown in FIG. 11) an administrator API 1105.

The cloud management interface 1005 of some embodiments represents all of the various interfaces with the cloud services applications. As described above by reference to FIG. 2, these interfaces may include the data integration module to receive network state updates, the query API to receive requests from the cloud services as to whether actions that will modify network state are permitted, and the action executor to send commands to the cloud services to perform various actions for remedying violations.

The set of tables 1010 includes the network state tables in some embodiments. As shown in FIG. 10, these tables include the network state information received from the cloud service applications, as well as violations identified by the table evaluation engine 1020. In some embodiments, the set of tables 1010 also includes tables generated from the network state information according to the various policies, such as pairs of names that are in the same group, counts of VMs being used for different purposes, etc.

As with the monitor 515, the network state monitor 1015 listens on the set of tables 1010 for updates to the tables, which the monitor reports to the table evaluation engine 1020 as events. The table evaluation engine 1020 performs the table mapping operations according to the declared policies, as described in the sections above.

FIG. 10 also illustrates two cloud service managers 1025 and 1130. These cloud service managers may include a network virtualization manager, a compute virtualization manager, a storage virtualization manager, a group directory manager, etc.

As shown by the encircled 1, the cloud management interface 1005 (e.g., the data integration module) receives a network state update from the cloud service manager 1030. This state update may include insert or delete commands referencing one or more data tuples, in some embodiments, in order to inform the policy management application 1000 of a change made to the network state by the cloud service manager 1030. The cloud management interface 1005, as shown by the encircled 2, stores this network state update in the set of tables 1010 by modifying the appropriate records in the appropriate tables.

Next, the network state monitor 1015 identifies these changes to the tables, and notifies the table evaluation engine 1020 of an event (i.e., the change in state), as shown by the encircled 3. Based on this event, the table evaluation engine performs table mapping operations according to any policies that have been declared for the policy management system. If the table evaluation engine were not to find any violations, then no further actions would take place with regard to the state update. However, in this case, the table evaluation engine 1020 identifies the presence of a violation, which is output to the set of tables 1010 as a new record in the violations table, as shown by the encircled 4.

As a result, the network state monitor 1015 identifies the update to the violations table as another change, and again notifies the table evaluation engine 1020 of an event, as shown by the encircled 5. Based on this event, the table evaluation engine again performs table mapping operations according to its policies. Some embodiments use the available actions policies to identify corrections to the violation, while other embodiments use the enforcement actions to identify a specified action to use in correcting the violation. In this case, using the available actions policies, the table evaluation engine identifies an action or set of actions to perform, and reports this to the cloud management interface 1005 so that the appropriate cloud service manager can be notified, as shown by the encircled 6. The cloud management interface (e.g., the action executor) then sends a command to the first cloud service manager 1025 to perform the action, as shown by the encircled 6. In this example, an update from one of the cloud service managers 1030 resulted in a command to perform an action sent to a different one of the cloud service managers 1025.

In this example, a single set of remediative actions is computed for the violation, and sent directly to the cloud management interface without any administrator interaction. This could be done because the set of actions was the only one computed for the identified violation, or because the system had cached a set of actions for the type of violation based on previous administrator interaction.

FIG. 11, on the other hand, conceptually illustrates the case in which an administrator 1100 provides input to select one of the sets of actions to perform. This figure illustrates the policy management system 1000, including the administrator interface 1105 that was not shown in the previous figure. The administrator interface, in some embodiments, provides a user interface to an administrator that allows the administrator to choose how to handle policy violations.

In this example, the first several operations are the same as in FIG. 10. The cloud management interface 1005 receives an update (this time from the cloud service manager 1025), and stores this update in the set of tables 1010. The monitor 1015 detects this update and notifies the table evaluation engine 1020, which identifies a violation and stores a record indicating this violation in the set of tables 1010. The monitor 1015 again notices the update and notifies the table evaluation engine 1020, which computes the sets of actions available to correct the violation.

In this case, as shown by the encircled 6, the table evaluation engine 1020 identifies several sets of actions, and passes these to the administrator interface 1105. The administrator interface 1105 presents these sets of actions to the administrator 1100 (e.g., via a dashboard interface), as shown by the encircled 7, and receives a selection from the administrator 1100 as shown by the encircled 8. The administrator selects one of the possible sets of actions for the policy management system 1000 to execute in order to correct the violation.

As shown, the administrator interface 1105 conveys this selected action or set of actions to the cloud management interface 1005 so that the appropriate cloud service manager can be notified, as shown by the encircled 9. The cloud management interface (e.g., the action executor) then sends a command to the first cloud service manager 1025 to perform the action, as shown by the encircled 10. In this example, the same cloud service manager that provides the violation-causing update also receives the action to correct the violation. In some embodiments, if multiple actions are required, the actions might be performed by several different cloud service managers. If the order of the actions is important, some embodiments wait to receive verification that a first action has been performed before notifying the appropriate cloud service manager of the next action.

Figure 12:
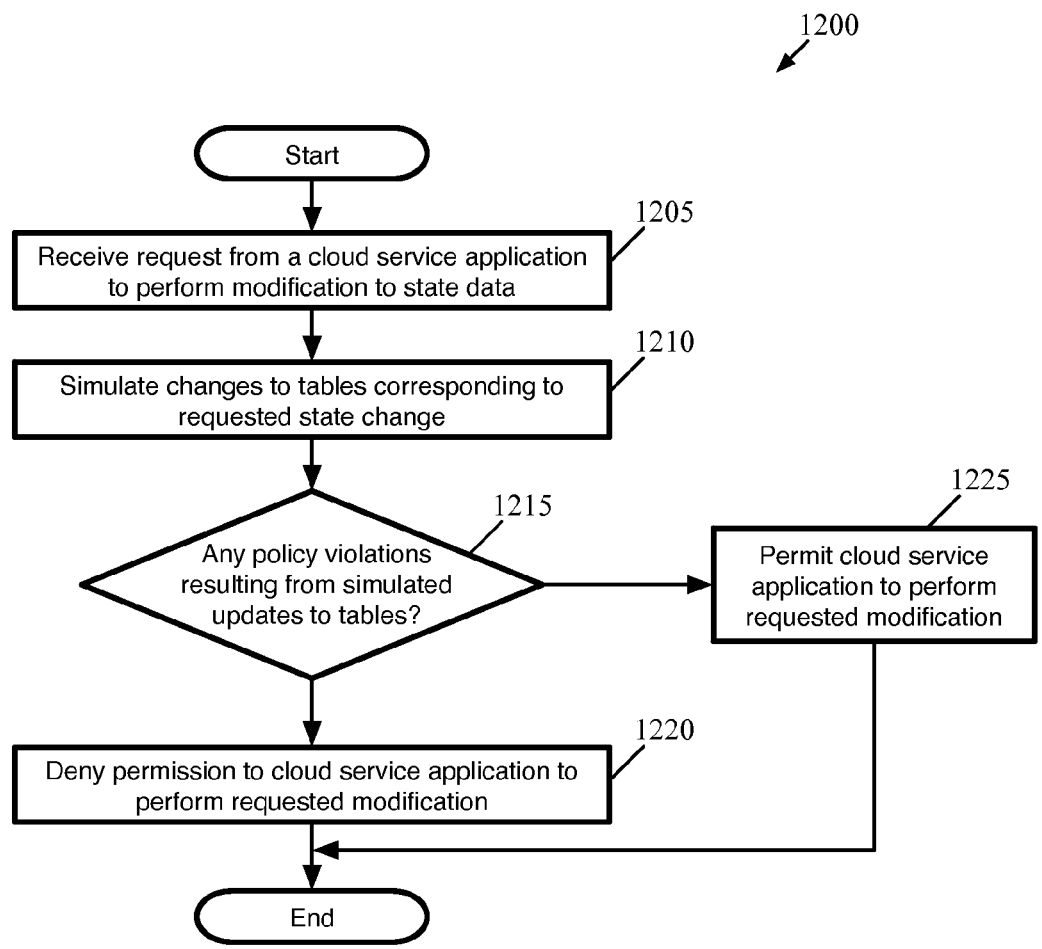
FIG. 12 conceptually illustrates a process of some embodiments for performing proactive enforcement of policy to prevent violations.

The above process and examples related to reactive and interactive policy enforcement, which occurs after violations of the policy have been detected. Some embodiments also perform proactive enforcement to prevent violations before they occur. FIG. 12 conceptually illustrates a process 1200 of some embodiments for performing proactive enforcement of policy to prevent violations. The process 1200 is performed by the policy management system of some embodiments, in particular by a policy manager with a table mapping engine as described in the previous Section II. As noted earlier in this section, the process 1200 could be performed by a policy manager that uses available actions and allowed states policy rules (though a similar process could also be performed by a policy manager using allowed actions policy rules).

As shown, the process 1200 begins by receiving (at 1205) a request from a cloud service application or manager to perform a particular action that will modify the network state data. The cloud service application may be a network virtualization manager, computer virtualization manager, storage virtualization manager, firewall or antivirus manager, group directory, etc. In some embodiments, as described above, these cloud service management applications send requests to a query API of the policy management system for permission to perform their actions. The query API then passes these requests on to the policy manager (either directly, or by writing the requested actions into a reserved table in the network state data for such actions that need to be evaluated).

Upon receiving the request, the process 1200 simulates (at 1210) the changes to the network state tables that correspond to the requested state change. As described in the previous sections, the available actions policy rules indicate the changes (i.e., which data tuples would be added and which data tuples would be deleted) that each action will make to the network state. Some embodiments use the current network state to simulate these changes, and store the changes in a volatile memory (i.e., not as part of the current network state). That is, some embodiments store a temporary copy of the affected tables for use in determining whether violations are now present.

After simulating the changes to the network state, the process determines (at 1215) whether any policy violations result from these changes. To perform this determination, some embodiments treat the simulated updates as new events and use the allowed states policies to determine whether any new violations are present. Some embodiments use the simulated tables for any tables that were updated, and the current network state tables for any tables that were not changed but are needed to determine whether policy has been violated (rather than copying the entire network state to memory for the simulation).

When the simulated state results in one or more policy violations, the process denies (at 1220) permission to perform the requested modification to the cloud service application. On the other hand, when the simulated state does not cause any policy violations, the process permits (at 1225) the cloud service application to perform the requested modification. In some embodiments, the policy manager sends this response to the requesting cloud service application through the query API through which the cloud service application made the permission request. The process 1200 then ends.

In some embodiments, the process also stores the simulated changes in the network state when no policy violations occur and the action is permitted, on the premise that the action will now be carried out. On the other hand, to avoid the possibility that the action will not actually be taken by the cloud service application (e.g., because of a failure), other embodiments wait until the cloud service application takes the action and reports the resulting new state as an update.

Figure 13:
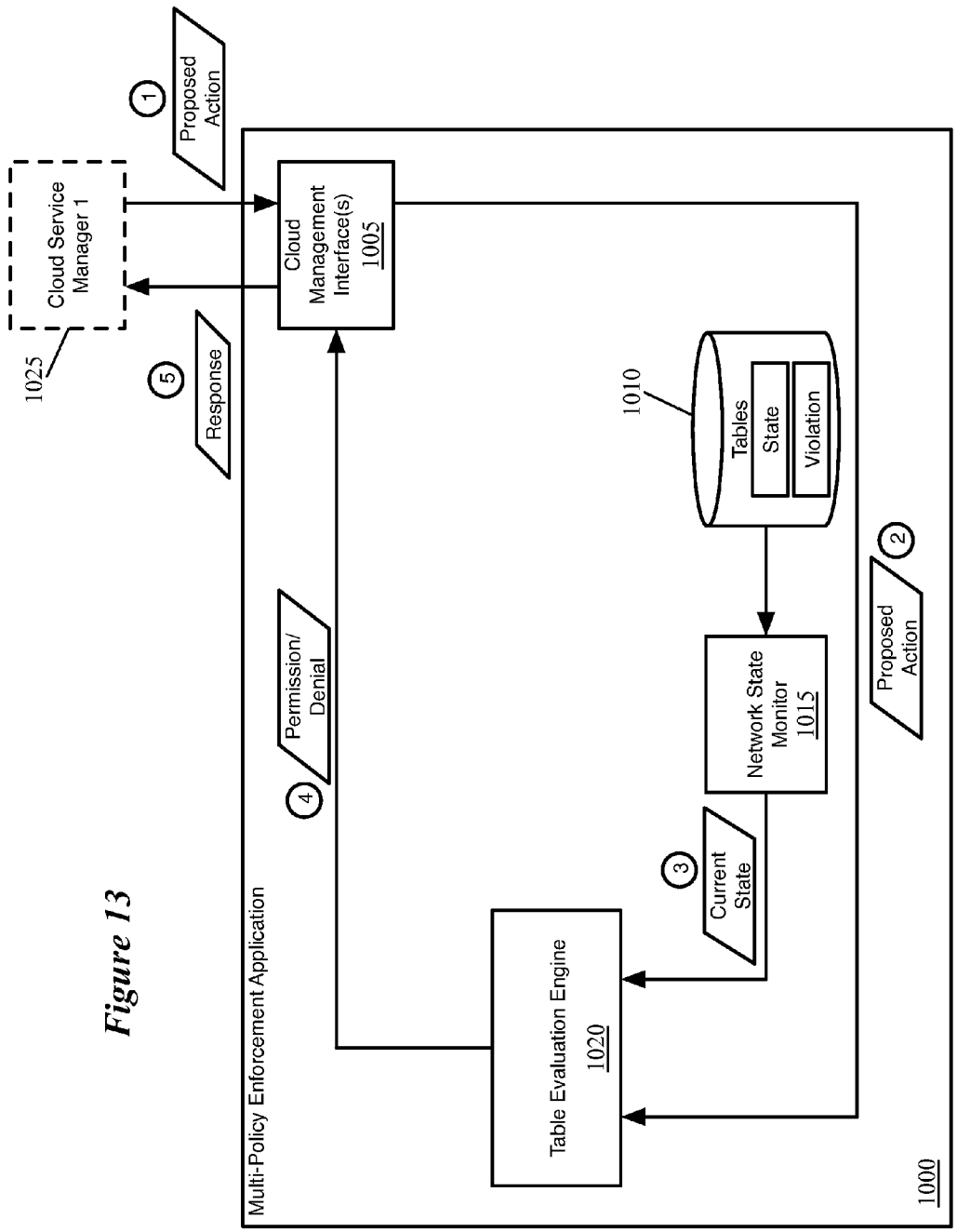
FIG. 13 conceptually illustrates the data flow through the policy management system of some embodiments for proactive enforcement.

FIG. 13 conceptually illustrates the data flow through the policy management system 1000 of some embodiments for proactive enforcement, as described by the process 1200. This figure shows the cloud management interface 1005, set of tables 1010, cloud state monitor 1015, and table evaluation engine 1020, as described above by reference to FIG. 10.

As shown by the encircled 1, in this example the cloud management interface 1005 (e.g., the query API) receives a proposed action from the cloud service manager 1025. The proposed action may be received as an API call request permission to perform a particular action (e.g., a disconnect_network action, a connect_network action, a create_vm action, etc.) with one or more parameters (e.g., the name of the VM, network, group, etc. to which the action will be applied).

The cloud management interface then forwards this proposed action to the table evaluation engine 1020, as shown by the encircled 2. In other embodiments, however, the cloud management interface 1005 writes the proposed action into one of the tables 1010 (i.e., a table reserved for such proposed actions). In this case, the cloud state monitor 1015 would notice the change to the tables and report the new proposed action to the table evaluation engine 1020 as a new event. As shown by the encircled 3, the table evaluation engine also uses the current network state for its calculations (which may not necessarily require the monitor 1015 for its retrieval—in some embodiments, the table evaluation engine is able to access the network state tables as needed to perform its table mapping operations).

Upon receiving the new event, the table evaluation engine 1020 performs its computations to determine whether to permit the performance of the proposed action. As described above, in some embodiments the table evaluation engine uses the available actions policy rules to simulate the application of the proposed action to the current network state, and generates a temporary set of updated tables that represent the network state after the proposed action has been performed. The table evaluation engine 1020 can then determine whether any of these simulated updates to the network state result in violations of policy using the allowed states policy rules.

As shown by the encircled 4, based on this determination, the table evaluation engine sends either a permit message or a deny message to the cloud management interface 1005. The interface 1005 (e.g., the query API) responds to the requesting cloud service manager 1025, as shown by the encircled 5, indicating whether or not the cloud service manager may perform the requested operation.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 14:
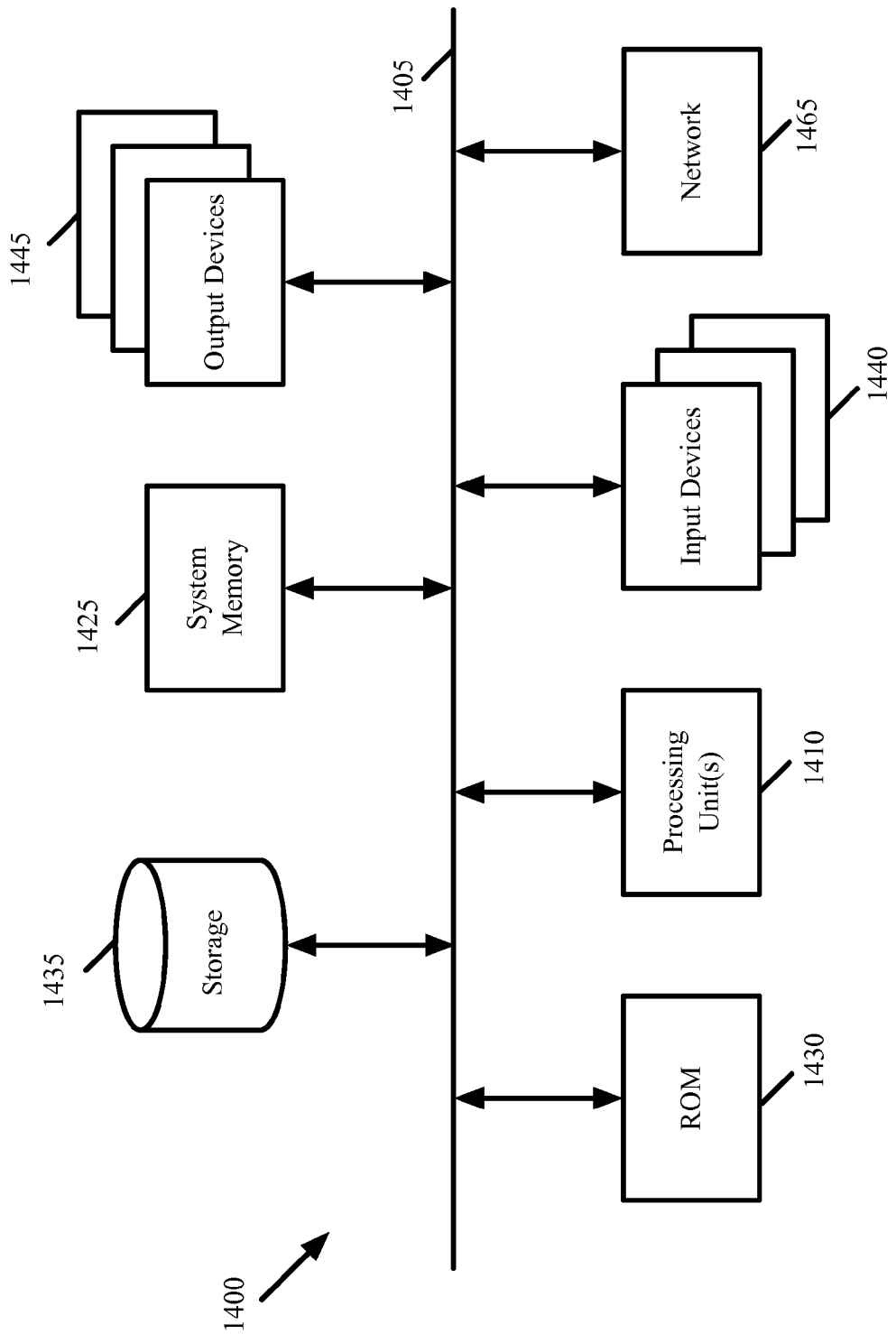
FIG. 14 conceptually illustrates an electronic system with which some embodiments of the invention are implemented.

FIG. 14 conceptually illustrates an electronic system 1400 with which some embodiments of the invention are implemented. The electronic system 1400 can be used to execute any of the control, virtualization, or operating system applications described above. The electronic system 1400 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1400 includes a bus 1405, processing unit(s) 1410, a system memory 1425, a read-only memory 1430, a permanent storage device 1435, input devices 1440, and output devices 1445.

The bus 1405 collectively represents all system, peripheral, and chipset buses that communicatively connect the numerous internal devices of the electronic system 1400. For instance, the bus 1405 communicatively connects the processing unit(s) 1410 with the read-only memory 1430, the system memory 1425, and the permanent storage device 1435.

From these various memory units, the processing unit(s) 1410 retrieve instructions to execute and data to process in order to execute the processes of the invention. The processing unit(s) may be a single processor or a multi-core processor in different embodiments.

The read-only-memory (ROM) 1430 stores static data and instructions that are needed by the processing unit(s) 1410 and other modules of the electronic system. The permanent storage device 1435, on the other hand, is a read-and-write memory device. This device is a non-volatile memory unit that stores instructions and data even when the electronic system 1400 is off. Some embodiments of the invention use a mass-storage device (such as a magnetic or optical disk and its corresponding disk drive) as the permanent storage device 1435.

Other embodiments use a removable storage device (such as a floppy disk, flash drive, etc.) as the permanent storage device. Like the permanent storage device 1435, the system memory 1425 is a read-and-write memory device. However, unlike storage device 1435, the system memory is a volatile read-and-write memory, such a random access memory. The system memory stores some of the instructions and data that the processor needs at runtime. In some embodiments, the invention's processes are stored in the system memory 1425, the permanent storage device 1435, and/or the read-only memory 1430. From these various memory units, the processing unit(s) 1410 retrieve instructions to execute and data to process in order to execute the processes of some embodiments.

The bus 1405 also connects to the input and output devices 1440 and 1445. The input devices enable the user to communicate information and select commands to the electronic system. The input devices 1440 include alphanumeric keyboards and pointing devices (also called "cursor control devices"). The output devices 1445 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 14, bus 1405 also couples electronic system 1400 to a network 1465 through a network adapter (not shown). In this manner, the computer can be a part of a network of computers (such as a local area network ("LAN"), a wide area network ("WAN"), or an Intranet, or a network of networks, such as the Internet. Any or all components of electronic system 1400 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 1, 9, and 12) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method to monitor a network to prevent violations of network policies, the method comprising: simulating, by executing an instruction with a processor, application of a change to a first set of network state data in temporary memory to generate simulated network state data by determining at least one of (A) a first set of data tuples that will be added or (B) a second set of data tuples that will be removed when the change to the first set of network state data occurs in a first cloud management application, the change identified in a request received from the first cloud management application; analyzing, by executing an instruction with the processor, the simulated network state data stored in the temporary memory to determine if the change violates a network policy declared for the network; enforcing the network policy proactively by: issuing, by executing an instruction with the processor, a first command to the first cloud management application to permit the change in the first cloud management application when the simulated network state data does not violate the network policy; issuing, by executing an instruction with the processor, a second command to the first cloud management application to prevent the change in the first cloud management application when the simulated network state data violates the network policy; and enforcing the network policy reactively by: determining, by executing an instruction with the processor, that a third set of data tuples of updated network state data corresponding to a storage network match a violation condition specified by the network policy; and issuing, by executing an instruction with the processor, a third command to a second cloud management application to modify the network state data corresponding to the storage network into modified network state data that does not violate the network policy.

2. The method of claim 1, wherein the network policy is represented by a set of conditions describing data tuples in the network state data.

3. The method of claim 1, wherein the network state data includes a plurality of data tuples corresponding to resources accessing the network.

4. The method of claim 1, wherein the issuing of the third command includes: identifying a second policy declared for the network that specifies (1) actions that the first and second cloud management applications can take, and (2) effects on the network state of the specified actions; calculating, based on the second policy, a set of actions that will remove the violation; and issuing the third command to the second cloud management application to perform the set of actions.

5. The method of claim 4, wherein the set of actions is the only set of actions calculated.

6. The method of claim 4, wherein the set of actions includes a plurality of actions, the method further including issuing a fourth command to a third cloud management application to modify the network state data based on the set of actions.

7. The method of claim 4, further including: calculating a plurality of different sets of actions; presenting the plurality of sets of actions to a user through a user interface; and receiving a selection through the user interface of one of the different sets of actions.

8. The method of claim 7, further including presenting (1) an explanation of the violation and (2) the different sets of actions possible to remedy the violation.

9. The method of claim 7, wherein the user is a network administrator.

10. The method of claim 7, further including caching the selected one of the sets of actions to use automatically for future violations.

11. A machine readable medium comprising instructions that, when executed, cause a processor to at least: simulate application of a change to a first set of network state data in temporary memory to generate simulated network state data by determining at least one of (A) a first set of data tuples that will be added or (B) a second set of data tuples that will be removed when the change to the first set of network state data occurs in a first cloud management application, the change identified in a request received from the first cloud management application; analyze the simulated network state data stored in the temporary memory to determine if the change violates a network policy declared for the network; enforce the network policy proactively by: issuing a first command to the first cloud management application to permit the change in the first cloud management application when the simulated network state data does not violate the network policy; issuing a second command to the first cloud management application to prevent the change in the first cloud management application when the simulated network state data violates the network policy; and enforce the network policy reactively by: determining that a third set of data tuples of updated network state data corresponding to a storage network match a violation condition specified by the network policy; and issuing a third command to a second cloud management application to modify the network state data corresponding to a storage network into modified network state data that does not violate the network policy.

12. The machine readable medium of claim 11, wherein the network policy is represented by a set of conditions describing data tuples in the network state data.

13. The machine readable medium of claim 11, wherein the network state data includes a plurality of data tuples corresponding to resources accessing the network.

14. The machine readable medium of claim 11, wherein the instructions cause the processor to: identify a second policy declared for the network that specifies (1) actions that the first and second cloud management applications can take, and (2) effects on the network state of the specified actions; calculate, based on the second policy, a set of actions that will remove the violation; and issue the third command to the second cloud management application to perform the set of actions.

15. The machine readable medium of claim 14, wherein the instructions cause the processor to: calculate a plurality of different sets of actions; present the plurality of sets of actions to a user through a user interface; and receive a selection through the user interface of one of the different sets of actions.

16. The machine readable medium of claim 15, wherein the instructions cause the processor to cache the selected one of the sets of actions to use automatically for future violations.

17. The machine readable medium of claim 14, wherein the set of actions includes a plurality of actions, the instructions to cause the processor to issue a fourth command to a third cloud management application to modify the network state data based on the set of actions.

* * * * *